United States Patent
Izhikevich et al.

(10) Patent No.: US 9,862,092 B2
(45) Date of Patent: Jan. 9, 2018

(54) INTERFACE FOR USE WITH TRAINABLE MODULAR ROBOTIC APPARATUS

(71) Applicant: BRAIN Corporation, San Diego, CA (US)

(72) Inventors: Eugene Izhikevich, San Diego, CA (US); Dimitry Fisher, San Diego, CA (US); Jean-Baptiste Passot, La Jolla, CA (US); Heathcliff Hatcher, San Diego, CA (US); Vadim Polonichko, San Diego, CA (US)

(73) Assignee: Brain Corporation, San Diego, CA (US)

( * ) Notice: Subject to any disclaimer, the term of this patent is extended or adjusted under 35 U.S.C. 154(b) by 6 days.

(21) Appl. No.: 14/958,825

(22) Filed: Dec. 3, 2015

(65) Prior Publication Data
US 2016/0151912 A1  Jun. 2, 2016

Related U.S. Application Data

(62) Division of application No. 14/209,826, filed on Mar. 13, 2014, now Pat. No. 9,533,413.

(51) Int. Cl.
*B25J 9/16* (2006.01)
*G06N 3/08* (2006.01)
(Continued)

(52) U.S. Cl.
CPC ............ *B25J 9/163* (2013.01); *A63H 3/20* (2013.01); *B25J 9/1694* (2013.01); *B25J 13/08* (2013.01);
(Continued)

(58) Field of Classification Search
None
See application file for complete search history.

(56) References Cited

U.S. PATENT DOCUMENTS 4,600,355 A * 7/1986 Johnson .................. B25J 9/046
248/558
4,687,457 A   8/1987 Milner
(Continued)

FOREIGN PATENT DOCUMENTS

CN     102226740 A    10/2011
JP     H0487423 A     3/1992
(Continued)

OTHER PUBLICATIONS

Badescu, Novel Smart Connector for Modular Robotics, Jul. 2001, IEEWASME Internalional Conference on Advanced Intelligent Mechatronics Proceedings.*
(Continued)

*Primary Examiner* — Ryan Rink
(74) *Attorney, Agent, or Firm* — Gazdzinski & Associates, PC

(57) ABSTRACT

Apparatus and methods for a modular robotic device with artificial intelligence that is receptive to training controls. In one implementation, modular robotic device architecture may be used to provide all or most high cost components in an autonomy module that is separate from the robotic body. The autonomy module may comprise controller, power, actuators that may be connected to controllable elements of the robotic body. The controller may position limbs of the toy in a target position. A user may utilize haptic training approach in order to enable the robotic toy to perform target action(s). Modular configuration of the disclosure enables users to replace one toy body (e.g., the bear) with another (e.g., a giraffe) while using hardware provided by the autonomy module. Modular architecture may enable users to purchase a single AM for use with multiple robotic bodies, thereby reducing the overall cost of ownership.

20 Claims, 12 Drawing Sheets

(51) Int. Cl.
*G06N 99/00* (2010.01)
*G06N 3/00* (2006.01)
*B25J 13/08* (2006.01)
*A63H 3/20* (2006.01)
*G06N 3/04* (2006.01)

(52) U.S. Cl.
CPC .......... *G06N 3/008* (2013.01); *G06N 99/005* (2013.01); *G06N 3/049* (2013.01); *Y10S 901/02* (2013.01); *Y10S 901/04* (2013.01); *Y10S 901/09* (2013.01); *Y10S 901/50* (2013.01)

(56) References Cited

U.S. PATENT DOCUMENTS

| | | | |
|---|---|---|---|
| 4,762,455 A * | 8/1988 | Coughlan | B25J 3/04 |
| | | | 376/248 |
| 4,820,233 A | 4/1989 | Weiner | |
| 4,853,771 A | 8/1989 | Witriol et al. | |
| 4,889,027 A | 12/1989 | Yokoi | |
| 5,042,807 A | 8/1991 | Sasakawa et al. | |
| 5,063,603 A | 11/1991 | Burt | |
| 5,355,435 A | 10/1994 | DeYong et al. | |
| 5,369,497 A | 11/1994 | Allen et al. | |
| 5,378,188 A | 1/1995 | Clark | |
| 5,638,359 A | 6/1997 | Peltola et al. | |
| 5,652,594 A | 7/1997 | Costas | |
| 5,673,367 A | 9/1997 | Buckley | |
| 5,875,108 A | 2/1999 | Hoffberg et al. | |
| 6,009,418 A | 12/1999 | Cooper | |
| 6,014,653 A | 1/2000 | Thaler | |
| 6,253,058 B1 | 6/2001 | Murasaki et al. | |
| 6,259,988 B1 | 7/2001 | Galkowski et al. | |
| 6,338,013 B1 | 1/2002 | Ruffner | |
| 6,411,055 B1 * | 6/2002 | Fujita | B25J 9/1679 |
| | | | 318/568.11 |
| 6,429,291 B1 | 8/2002 | Turley et al. | |
| 6,435,936 B1 | 8/2002 | Rehkemper et al. | |
| 6,458,157 B1 | 10/2002 | Suaning | |
| 6,504,610 B1 | 1/2003 | Bauer et al. | |
| 6,545,705 B1 | 4/2003 | Sigel et al. | |
| 6,545,708 B1 | 4/2003 | Tamayama et al. | |
| 6,546,291 B2 | 4/2003 | Merfeld et al. | |
| 6,547,631 B1 | 4/2003 | Randall | |
| 6,560,511 B1 * | 5/2003 | Yokoo | A63H 11/00 |
| | | | 318/568.11 |
| 6,565,407 B1 | 5/2003 | Woolington et al. | |
| 6,581,046 B1 | 6/2003 | Ahissar | |
| 6,615,108 B1 | 9/2003 | Peless et al. | |
| 6,682,392 B2 | 1/2004 | Chan | |
| 6,697,711 B2 * | 2/2004 | Yokono | G06N 3/008 |
| | | | 318/568.1 |
| 6,760,645 B2 * | 7/2004 | Kaplan | A63H 11/00 |
| | | | 318/568.1 |
| 6,774,908 B2 | 8/2004 | Bates et al. | |
| 6,780,042 B1 * | 8/2004 | Badescu | H01R 13/20 |
| | | | 439/352 |
| 7,023,833 B1 | 4/2006 | Aiello et al. | |
| 7,054,850 B2 | 5/2006 | Matsugu | |
| 7,235,013 B2 | 6/2007 | Kobayashi | |
| 7,418,320 B1 | 8/2008 | Bodin et al. | |
| 7,565,203 B2 | 7/2009 | Greenberg et al. | |
| 7,765,029 B2 | 7/2010 | Fleischer et al. | |
| 7,849,030 B2 | 12/2010 | Ellingsworth | |
| 8,015,130 B2 | 9/2011 | Matsugu et al. | |
| 8,015,785 B2 | 9/2011 | Walker et al. | |
| 8,145,355 B2 | 3/2012 | Danko | |
| 8,145,492 B2 * | 3/2012 | Fujita | G10L 15/16 |
| | | | 704/203 |
| 8,154,436 B2 | 4/2012 | Szajnowski | |
| 8,281,997 B2 | 10/2012 | Moran et al. | |
| 8,295,955 B2 | 10/2012 | Dibernardo et al. | |
| 8,315,305 B2 | 11/2012 | Petre et al. | |
| 8,346,692 B2 | 1/2013 | Rouat et al. | |
| 8,401,242 B2 | 3/2013 | Newcombe et al. | |
| 8,467,623 B2 | 6/2013 | Izhikevich et al. | |
| 8,515,160 B1 | 8/2013 | Khosla et al. | |
| 8,527,094 B2 | 9/2013 | Kumar et al. | |
| 8,578,810 B2 * | 11/2013 | Donhowe | A61B 17/00 |
| | | | 600/141 |
| 8,583,286 B2 | 11/2013 | Fleischer et al. | |
| 8,712,939 B2 | 4/2014 | Szatmary et al. | |
| 8,712,941 B2 | 4/2014 | Izhikevich et al. | |
| 8,719,199 B2 | 5/2014 | Izhikevich et al. | |
| 8,725,658 B2 | 5/2014 | Izhikevich et al. | |
| 8,725,662 B2 | 5/2014 | Izhikevich et al. | |
| 8,731,295 B2 | 5/2014 | Schepelmann et al. | |
| 8,756,183 B1 | 6/2014 | Daily et al. | |
| 8,775,341 B1 | 7/2014 | Commons | |
| 8,793,205 B1 | 7/2014 | Fisher et al. | |
| 8,880,222 B2 | 11/2014 | Kawamoto et al. | |
| 8,943,008 B2 | 1/2015 | Ponulak et al. | |
| 8,954,193 B2 | 2/2015 | Sandin et al. | |
| 8,972,315 B2 | 3/2015 | Szatmary et al. | |
| 8,977,582 B2 | 3/2015 | Richert | |
| 8,983,216 B2 | 3/2015 | Izhikevich et al. | |
| 8,990,133 B1 | 3/2015 | Ponulak et al. | |
| 8,996,177 B2 | 3/2015 | Coenen | |
| 9,002,511 B1 | 4/2015 | Hickerson et al. | |
| 9,043,952 B2 | 6/2015 | Sandin et al. | |
| 9,508,235 B2 | 11/2016 | Suessemilch et al. | |
| 2001/0020944 A1 | 9/2001 | Brown et al. | |
| 2001/0045809 A1 | 11/2001 | Mukai | |
| 2002/0038294 A1 | 3/2002 | Matsugu | |
| 2002/0072293 A1 | 6/2002 | Beyo et al. | |
| 2002/0081937 A1 | 6/2002 | Yamada et al. | |
| 2002/0156556 A1 | 10/2002 | Ruffner | |
| 2002/0158599 A1 * | 10/2002 | Fujita | B25J 13/003 |
| | | | 318/568.11 |
| 2002/0183895 A1 | 12/2002 | Kaplan et al. | |
| 2002/0198854 A1 * | 12/2002 | Berenji | G06N 7/023 |
| | | | 706/12 |
| 2003/0050903 A1 | 3/2003 | Liaw et al. | |
| 2003/0222987 A1 | 12/2003 | Karazuba | |
| 2003/0232568 A1 | 12/2003 | Engel et al. | |
| 2004/0016638 A1 | 1/2004 | LaConti et al. | |
| 2004/0153211 A1 | 8/2004 | Kamoto et al. | |
| 2004/0158358 A1 | 8/2004 | Anezaki et al. | |
| 2004/0162638 A1 | 8/2004 | Solomon | |
| 2004/0193670 A1 | 9/2004 | Langan et al. | |
| 2004/0204792 A1 | 10/2004 | Taylor et al. | |
| 2004/0212148 A1 | 10/2004 | Losey et al. | |
| 2004/0220082 A1 | 11/2004 | Surmeier et al. | |
| 2004/0244138 A1 | 12/2004 | Taylor et al. | |
| 2005/0010331 A1 | 1/2005 | Taylor et al. | |
| 2005/0015351 A1 | 1/2005 | Nugent | |
| 2005/0022751 A1 | 2/2005 | Nelson | |
| 2005/0036649 A1 | 2/2005 | Yokono et al. | |
| 2005/0049749 A1 | 3/2005 | Watanabe et al. | |
| 2005/0065651 A1 | 3/2005 | Ayers et al. | |
| 2005/0209749 A1 | 9/2005 | Ito et al. | |
| 2005/0283450 A1 | 12/2005 | Matsugu et al. | |
| 2006/0069448 A1 | 3/2006 | Yasui | |
| 2006/0161218 A1 | 7/2006 | Danilov | |
| 2007/0037475 A1 | 2/2007 | Spear | |
| 2007/0176643 A1 | 8/2007 | Nugent | |
| 2007/0208678 A1 | 9/2007 | Matsugu | |
| 2007/0239315 A1 | 10/2007 | Sato et al. | |
| 2007/0244610 A1 | 10/2007 | Ozick et al. | |
| 2007/0258329 A1 | 11/2007 | Winey | |
| 2008/0039974 A1 | 2/2008 | Sandin et al. | |
| 2008/0201282 A1 | 8/2008 | Garcia et al. | |
| 2008/0294074 A1 | 11/2008 | Tong et al. | |
| 2009/0014402 A1 | 1/2009 | Wolf et al. | |
| 2009/0043722 A1 | 2/2009 | Nugent | |
| 2009/0118890 A1 | 5/2009 | Lin et al. | |
| 2009/0153499 A1 | 6/2009 | Kim et al. | |
| 2009/0287624 A1 | 11/2009 | Rouat et al. | |
| 2010/0036780 A1 | 2/2010 | Angelov | |
| 2010/0086171 A1 | 4/2010 | Lapstun | |
| 2010/0091286 A1 | 4/2010 | Dahlgren | |
| 2010/0166320 A1 | 7/2010 | Paquier | |
| 2010/0228418 A1 | 9/2010 | Whitlow et al. | |

(56) References Cited

U.S. PATENT DOCUMENTS

| | | |
|---|---|---|
| 2010/0250022 A1 | 9/2010 | Hines et al. |
| 2010/0283853 A1 | 11/2010 | Acree |
| 2010/0286824 A1 | 11/2010 | Solomon |
| 2010/0292835 A1 | 11/2010 | Sugiura et al. |
| 2011/0016071 A1 | 1/2011 | Guillen et al. |
| 2011/0119214 A1 | 5/2011 | Breitwisch et al. |
| 2011/0119215 A1 | 5/2011 | Elmegreen et al. |
| 2011/0178658 A1 | 7/2011 | Kotaba et al. |
| 2011/0184556 A1 | 7/2011 | Seth et al. |
| 2011/0228742 A1 | 9/2011 | Honkasalo et al. |
| 2011/0235698 A1 | 9/2011 | Petre et al. |
| 2011/0245974 A1 | 10/2011 | Kawamoto et al. |
| 2012/0011090 A1 | 1/2012 | Tang et al. |
| 2012/0083982 A1 | 4/2012 | Bonefas et al. |
| 2012/0098933 A1 | 4/2012 | Robinson et al. |
| 2012/0109866 A1 | 5/2012 | Modha |
| 2012/0117012 A1 | 5/2012 | Szatm ry et al. |
| 2012/0143495 A1 | 6/2012 | Dantu |
| 2012/0173021 A1 | 7/2012 | Tsusaka |
| 2012/0185092 A1 | 7/2012 | Ku |
| 2012/0209428 A1 | 8/2012 | Mizutani |
| 2012/0209432 A1 | 8/2012 | Fleischer et al. |
| 2012/0211923 A1 | 8/2012 | Garner et al. |
| 2012/0215348 A1* | 8/2012 | Skrinde ............ B08B 9/049 700/245 |
| 2012/0303091 A1 | 11/2012 | Izhikevich |
| 2012/0308076 A1 | 12/2012 | Piekniewski et al. |
| 2012/0308136 A1 | 12/2012 | Izhikevich |
| 2012/0330872 A1 | 12/2012 | Esser et al. |
| 2013/0046716 A1 | 2/2013 | Chan et al. |
| 2013/0073491 A1 | 3/2013 | Izhikevich et al. |
| 2013/0073496 A1 | 3/2013 | Szatmary et al. |
| 2013/0073500 A1 | 3/2013 | Szatmary et al. |
| 2013/0077597 A1 | 3/2013 | Nukala et al. |
| 2013/0103626 A1 | 4/2013 | Hunzinger |
| 2013/0116827 A1 | 5/2013 | Inazumi |
| 2013/0117212 A1 | 5/2013 | Hunzinger et al. |
| 2013/0151450 A1 | 6/2013 | Ponulak |
| 2013/0176423 A1 | 7/2013 | Rischmuller et al. |
| 2013/0204814 A1 | 8/2013 | Hunzinger et al. |
| 2013/0204820 A1 | 8/2013 | Hunzinger et al. |
| 2013/0216144 A1 | 8/2013 | Robinson et al. |
| 2013/0218821 A1 | 8/2013 | Szatmary et al. |
| 2013/0226342 A1* | 8/2013 | Green ............ B25J 9/08 700/245 |
| 2013/0245937 A1 | 9/2013 | Dibernardo et al. |
| 2013/0251278 A1 | 9/2013 | Izhikevich et al. |
| 2013/0314502 A1 | 11/2013 | Urbach et al. |
| 2013/0325768 A1 | 12/2013 | Sinyavskiy et al. |
| 2013/0325773 A1 | 12/2013 | Sinyavskiy et al. |
| 2013/0325774 A1 | 12/2013 | Sinyavskiy et al. |
| 2013/0325775 A1 | 12/2013 | Sinyavskiy et al. |
| 2014/0008496 A1 | 1/2014 | Ye et al. |
| 2014/0016858 A1 | 1/2014 | Richert |
| 2014/0032021 A1 | 1/2014 | Metzler et al. |
| 2014/0089232 A1 | 3/2014 | Buibas et al. |
| 2014/0175267 A1 | 6/2014 | Thiel et al. |
| 2014/0240492 A1 | 8/2014 | Lee et al. |
| 2014/0276951 A1* | 9/2014 | Hourtash ............ A61B 19/2203 606/130 |
| 2014/0350722 A1* | 11/2014 | Skrinde ............ B08B 9/049 700/245 |
| 2015/0157182 A1 | 6/2015 | Noh et al. |
| 2015/0168954 A1 | 6/2015 | Hickerson et al. |
| 2015/0234385 A1 | 8/2015 | Sandin et al. |
| 2015/0362919 A1 | 12/2015 | Bernstein et al. |
| 2016/0179096 A1 | 6/2016 | Bradlow et al. |

FOREIGN PATENT DOCUMENTS

| | | |
|---|---|---|
| RU | 2108612 C1 | 4/1998 |
| WO | WO-2008083335 A2 | 7/2008 |
| WO | WO-2010136961 A1 | 12/2010 |

OTHER PUBLICATIONS

Jain, Learning Trajectory Preferences for Manipulators via Iterative Improvement Jun. 2013.*

PR2 User Manual, Oct. 5, 2012.*

Alexandros <g class="gr_gr_3 gr-alert gr_spell ContextualSpelling ins-del multiReplace" id="3" data-gr-id="3">Bouganis</g> and Murray Shanahan, "Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet: <ahref="http://msc.berkeley.edu/wjchen/publications/DSC12.sub.--8726.sub.--FI-.pdf">http://msc.berkeley.edu/wjchen/publications/DSC12.sub.--8726.sub.--FI-.pdf</a><http:/>.

Bill Steele, The Human Touch Makes Robots Defter, Nov. 6, 2013, Cornell Chronicle. http://www.news.cornell.edu/stories/2013/11/human-touch-makes-robots-defter.

Bohte, 'Spiking Nueral Networks' Doctorate at the University of Leiden, Holland, Mar. 5, 2003, pp. 1-133 [retrieved on Nov. 14, 2012]. Retrieved from the interne <ahref="http://homepages.cwi.nl/~sbohte/publication/phdthesis.pdf">http://homepages.cwi.nl/~sbohte/publication/phdthesis.pdf</a><url: />.

Brette et al., Brian: a simple and flexible simulator for spiking neural networks, The Neuromorphic Engineer, Jul. 1, 2009, pp. 1-4, doi: 10.2417/1200906.1659.

Cuntz et al., 'One Rule to Grow Them All: A General Theory of Neuronal Branching and Its Paractical Application' PLOS Computational Biology, 6 (8), Published Aug. 5, 2010.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.

Gewaltig et al.. 'NEST (Neural Simulation Tool)', Scholarpedia, 2007. pp. I-15. 2(4): 1430, doi: 1 0.4249/scholarpedia.1430.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

Graham, Lyle J., The Surf-Hippo Reference Manual, http://www.neurophys.biomedicale.univparis5. fr/graham/surf-hippo-files/Surf-Hippo%20Reference%20Manual.pdf, Mar. 2002. pp. 1-128.

Hardware and Software Platform for Mobile Manipulation R&D, 2012, https://web.archive.org/web/20120128031010/http://www.willowgarage.com/pages/pr2/design.

Huh et al., "Generalized Power Law for Curve Movements" 2011.

Huh et al., "Real-Time Motor Control Using Recurrent Neural Networks" IEEEE Apr. 2009.

(56) References Cited

OTHER PUBLICATIONS

Huh, "Rethinking Optimal Control of Human Movements" Thesis 2012.
Ishii K., et al., Designing Laser Gesture Interface for Robot Control, Springer Berlin Heidelberg, Proceedings, Part II 12th IFIP TC 13 International Conference, Uppsala, Sweden, Aug. 24-28, 2009, Proceedings, pp. 479-492.
Izhikevich E.M. (2006) Polychronization: Computation With Spikes. Neural Computation, 18:245-282.
Izhikevich et al., 'Relating STDP to BCM', Neural Computation (2003) 15, 1511-1523.
Izhikevich, 'Simple Model of Spiking Neurons', IEEE Transactions on Neural Networks, vol. 14, No. 6, Nov. 2003, pp. 1569-1572.
Jain, Learning Trajectory Preferences for Manipulators via Iterative Improvement, 2013, Advances in Neural Information Processing Systems 26 (NIPS 2013).
Karbowski et al., 'Multispikes and Synchronization in a Large Neural Network with Temporal Delays', Neural Computation 12. 1573-1606 (2000).
Kasabov, "Evolving Spiking Neural Networks for Spatio-and Spectro-Temporal Pattern Recognition", IEEE 6th International Conference Intelligent Systems 2012 [Retrieved on Jun 24, 2014], Retrieved from the Internet: &It;ahref="http://ncs.ethz.ch/projects/evospike/publications/evolving-spiking-neural-networks-for-spatio-and-spectro-temporal-pattern-recognition-plenary-talk-ieee-is/view">http://ncs.ethz.ch/projects/evospike/publications/evolving-spiking-neural-networks-for-spatio-and-spectro-temporal-pattern-recognition-plenary-talk-ieee-is/view&It;/a>.
Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet &It;URL:http://www-ee.uta.edu/eeweb/IP/Courses/SPR/Reference/ Khotanzad.pdf.
Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.
Laurent, 'The Neural Network Query Language (NNQL) Reference' [retrieved on Nov. 12, 2013]. Retrieved from the Internet: &It;URL'https://code.google.com/p/ nnql/issues/detail?id=1>.
Mordatch et al., "Discovery of Complex Behaviors through Contract-Invariant Optimization" ACM Transactions on Graphics (TOG)—SIGGRAPH 2012 Conference.
Nichols, A Reconfigurable Computing Architecture for Implementing Artificial Neural Networks on FPGA, Master's Thesis, The University of Guelph, 2003, pp. 1-235.
Paugam-Moisy et al., "Computing with spiking neuron networks" G. Rozenberg T. Back, J. Kok (Eds.), Handbook of Natural Computing, Springer-Verlag (2010) [retrieved Dec. 30, 2013], [retrieved online from link.springer.com ].
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet &It;URL: http://citeseerx.ist.psu.edu!viewdoc/download?doi=0.1.1.5.4346&rep-repl&type-pdf.
Pham et al., "Affine Invariance of Human Hand Movements: a direct test" 2012.
Pierre-Philippe Coupard, An Availabot-like computer-controlled push puppet for Linux, https://web.archive.org/web/20081106161941/http://myspace.voo.be/pcoupard/push_puppet_to_y/, 2008.
Schaal et al., An Example Application of Policy Improvement with Path Integrals (Pl.sup.2), Jun. 9, 2010.
Schemmel, J., Grub!, A., Meier, K., Mueller, E.: Implementing synaptic plasticity in a VLSI spiking neural network model. In: Proceedings of the 2006International Joint Conference on Neural Networks (IJCNN'06), IEEE Press (2006) Jul. 16-21, 2006, pp. 1-6 [online], [retrieved on Aug. 24, 2012]. Retrieved from the Internet &It;URL: http://www.kip.uniheidelberg.deNeroeffentlichungen/download.cgi/4620/ps/1774.pdf> Introduction.
Simulink.RTM. model [online], [Retrieved on Dec. 10, 2013] Retrieved from &It;URL:http://www.mathworks.com/ products/simulink/index.html>.
Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Suzuki et al., Operation Direction to a Mobile Robot by Projection Lights, 2005 IEEE Workshop on Advanced Robotics and its Social Impacts, Jun. 12-15, 2005, pp. 160-165.
Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioLorg/article/info%3Adoi% 2F10.1371%2Fjournal,pcbi.1000879&It;url:>&It;/url:>.
Tank D.W., et al., "Neural Computation by Concentrating Information in Time," Proceedings of the National Academy of Sciences of the United States of America, 1987, vol. 84 (7), pp. 1896-1900.
Todorov E., "Direct Cortical Control of Muscle Activation in Voluntary Arm Movements: a Model.," Nature Neuroscience, 2000, vol. 3 (4), pp. 391-398.
Baluja S., et al., "Expectation-based Selective Attention for Visual Monitoring and Control of a Robot Vehicle," Robotics and Autonomous Systems, 1997, pp. 329-344.
Brette, et al., "Simulation ofNetworks of Spiking Neurons: A Review of Tools and Strategies", Revised Apr. 12, 2007, Accepted Apr. 12, 2007, Springer Science, 50 pages.
Chistiakova, Marina, et al., "Heterosynaptic plasticity in the neocortex." Experimental brain research 199.3-4 (2009): 377-390.
Daniel Bush, "STDP, Rate-coded Hebbian Learning and Auto-Associative Network Models of the Hippocampus", Sep. 2008, University of Sussex, pp. 1-109.
Fletcher, L., et al., "Correlating Driver Gaze with the Road Scene for Driver Assistance Systems," Robotics and Autonomous Systems, 2005, pp. 71-84.
Glackin, C. et al., Feature Extraction from Spectra-temporal Signals using Dynamic Synapses, recurrency, and lateral inhibition, Neural Networks (IJCNN), The 2010 International Joint Conference on DOI: 10.1109/IJCNN.2010.5596818 Publication Year: 2010, pp. 1-6.
Itti, Laurent, et al., "Computational Modelling of Visual Attention", Nature Reviews—Neuroscience 2.3 (2001): 194-203.
Izhikevich, E,M. (2007) Dynamical Systems in Neuroscience: The Geometry of Excitability and Bursting, The MIT Press, 2007.
Izhikevich E.M., "Neural Excitability, Spiking and Bursting", Neurosciences Institute, Revised Oct. 25, 1999, 1171-1266, 96 pages.
Judd, T., et al., "Learning to Predict where Humans look," 12th International Conference on Computer Vision, 2009, 8 pages.
Kazantsev, et al., "Active Spike Transmission in the Neuron Model With a Winding Threshold Maniford", 01/03112,205-211,7 pages.
Kienzle, W. et al., "How to find interesting locations in video: a spatiotemporal point detector learned from human eye movements." Joint Pattern Recognition Symposium. Springer Berlin Heidelberg (2007) 10 pp.
Kling-Petersen, PhD, "Sun and HPC: From Systems to PetaScale" Sun Microsystems, no date, 31 pages.
Knoblauch A., et al., "Memory Capacities for Synaptic and Structural Plasticity," Neural Computation, 2010, vol. 22 (2), pp. 289-341.
Leydesdorff L., et al., "Classification and Powerlaws: The Logarithmic Transformation, Journal of the American Society for Information Science and Technology (forthcoming)", 2006.
Markram, Henry, et al. "Regulation of synaptic efficacy by coincidence of postsynaptic APs and EPSPs." Science 275.5297 (1997): 213-215.
Martinez-Perez, et al., "Automatic Activity Estimation Based on Object Behavior Signature", 2010, 10 pages.

(56) References Cited

OTHER PUBLICATIONS

Matsugu, et al., "Convolutional Spiking Neural Network for Robust Object Detection with Population Code Using Structured Pulse Packets", 2004, 39-55, 17 pages.

Medin I.C., et al., Modeling Cerebellar Granular layer Excitability and Combinatorial Computation with Spikes, Bio-Inspired Computing: Theories and Applications (BIC-TA), 2010 IEEE Fifth International Conference on DOI: 10.1 109/BICTA.201 0.5645274, Publication Year: 2010, pp. 1495-1503.

Meinhardt, et al., "Pattern formation by local self-activation and lateral inhibition." Bioessays 22.8 (2000): 753-760.

Mircea Badescu and Constantinos Mavroidis, Novel Smart Connector for Modular Robotics, Aug. 7, 2002, Advanced Intelligent Mechatronics, 2001. Proceedings. 2001 IEEE/ASME International Conference on.

Munn, S., et al., "Fixation-identification in Dynamic Scenes: Comparing an Automated Algorithm to Manual Coding," Proceedings of the 5th symposium on Applied Perception in Graphics and Visualization, 2008, pp. 33-42.

Niv, et al., Evolution of Reinforcement Learning in Uncertain Environments: A Simple Explanation for Complex Foraging Behaviors, International Society for Adaptive Behavior, 2002, vol. 10(1), pp. 5-24.

Ostojic, Srdjan, Nicolas Brunel, From Spiking Neuron Models to Linear-Nonlinear Models, Jan. 2011, vol. 7 (1), e1001056.

Ramachandran, et al., "The Perception of Phantom Limbs", The D.O. Hebb Lecture, Center for Brain and Cognition, University of California, 1998, 121, 1603-1630,28 pages.

Ruan, Chengmei, et al., Competitive behaviors of a spiking neural network with spike timing dependent plasticity, Biomedical Engineering and Informatics (BMEI), 2012 5th International Conference on DOI: 10.1109/BMEI.2012.6513088 Publication Year: 2012 , pp. 1015-1019.

Stringer, et al., "Invariant Object Recognition in the Visual System with Novel Views of 3D Objects", 2002, 2585-2596, 12 pages.

Swiercz, Waldemar, et al. "A new synaptic plasticity rule for networks of spiking neurons." Neural Networks, IEEE Transactions on 17.1 (2006): 94-105.

Thorpe, S.J., et al. (2001), Spike-based strategies for rapid processing. Neural Networks 14, pp. 715-725. *.

Thorpe, S.J., et al. (2004), SpikeNet: real-time visual processing with one spike per neuron, Neurocomputing, 58-60, pp. 857-864.

Victor, T., et al., "Sensitivity of Eye-movement Measurements to in-vehicle Task Difficulty," Transportation Research Part F: Traffic Psychology and Behavior, 2005, pp. 167-190.

Voutsas K., et al., A Biologically Inspired Spiking Neural Network for Sound Source Lateralization Neural Networks, IEEE Transactions on vol. 18, Issue: 6 DOI: 10.1109/TNN.2007.899623, Publication Year: 2007, pp. 1785-1799.

Wade, J.J. , et al., SWAT: A Spiking Neural Network Training Algorithm for Classification Problems, Neural Networks, IEEE Transactions on vol. 21 , Issue: 11 DOI: 10.1109/TNN.2010.2074212 Publication Year: 2010 , pp. 1817-1830.

Wennekers, T., Analysis of Spatia-temporal Patterns in Associative Networks of Spiking Neurons Artificial Neural Networks, 1999. 1CANN 99. Ninth International Conference on (Conf. Publ. No. 470) vol. 1 DOI:10.1049/cp:I9991116 Publication Year: 1999, vol. 1, pp. 245-250.

Won, W.J., et al., "Implementation of Road Traffic Signs Detection based on Saliency Map Model," IEEE Intelligent Vehicles Symposium, 2008, pp. 542-547.

Wu, QingXiang, et al., Edge Detection Based on Spiking Neural Network Model, ICIC 2007, LNAI 4682, pp. 26-34,2007, Springer-Verlag, Berlin Heidelberg.

Wu, QingXiang, et al. "Remembering Key Features of Visual Images based on Spike Timing Dependent Plasticity of Spiking Neurons." Image and Signal Processing, 2009. CISP'09. 2nd International Congress on. IEEE, 2009.

\* cited by examiner

INTERFACE FOR USE WITH TRAINABLE MODULAR ROBOTIC APPARATUS

PRIORITY AND CROSS-REFERENCE TO RELATED APPLICATIONS

This application is a divisional of and claims the benefit of priority to co-owned and co-pending U.S. patent application Ser. No. 14/209,826 filed on Mar. 13, 2014, titled "TRAINABLE MODULAR ROBOTIC APPARATUS", which is incorporated herein by reference in its entirety.

This application is related to co-owned and co-pending U.S. patent application Ser. No. 14/208,709 filed on Mar. 13, 2014 and entitled "TRAINABLE MODULAR ROBOTIC APPARATUS AND METHODS", and co-owned and co-pending U.S. patent Ser. No. 14/209,578 filed on Mar. 13, 2014 also entitled "TRAINABLE MODULAR ROBOTIC APPARATUS AND METHODS", each incorporated herein by reference in its entirety. This application is also related to co-pending U.S. patent application Ser. No. 13/829,919, entitled "INTELLIGENT MODULAR ROBOTIC APPARATUS AND METHODS", filed on Mar. 14, 2013, co-owned and co-pending U.S. patent application Ser. No. 13/830,398, entitled "NEURAL NETWORK LEARNING AND COLLABORATION APPARATUS AND METHODS", filed on Mar. 14, 2013, co-owned and co-pending U.S. patent application Ser. No. 14/102,410, entitled APPARATUS AND METHODS FOR HAPTIC TRAINING OF ROBOTS", filed on Dec. 10, 2013, co-owned U.S. patent application Ser. No. 13/623,820, entitled "APPARATUS AND METHODS FOR ENCODING OF SENSORY DATA USING ARTIFICIAL SPIKING NEURONS, filed Sep. 20, 2012 and issued as U.S. Pat. No. 9,047,568 on Jun. 2, 2015, co-owned U.S. patent application Ser. No. 13/540,429, entitled "SENSORY PROCESSING APPARATUS AND METHODS, filed Jul. 2, 2012 and issued as U.S. Pat. No. 9,014,416 on Apr. 21, 2015, co-owned U.S. patent application Ser. No. 13/548,071, entitled "SPIKING NEURON NETWORK SENSORY PROCESSING APPARATUS AND METHODS", filed Jul. 12, 2012 and issued as U.S. Pat. No. 8,977,582 on Mar. 10, 2015, co-owned and co-pending U.S. patent application Ser. No. 13/660,982, entitled "SPIKING NEURON SENSORY PROCESSING APPARATUS AND METHODS FOR SALIENCY DETECTION", filed Oct. 25, 2012, co-owned and co-pending U.S. patent application Ser. No. 13/842,530, entitled "ADAPTIVE PREDICTOR APPARATUS AND METHODS", filed Mar. 15, 2013, co-owned and co-pending U.S. patent application Ser. No. 13/918,338, entitled "ROBOTIC TRAINING APPARATUS AND METHODS", filed Jun. 14, 2013, co-owned and co-pending U.S. patent application Ser. No. 13/918,298, entitled "HIERARCHICAL ROBOTIC CONTROLLER APPARATUS AND METHODS", filed Jun. 14, 2013, Ser. No. 13/918,620, entitled "PREDICTIVE ROBOTIC CONTROLLER APPARATUS AND METHODS", filed Jun. 14, 2013, co-owned and co-pending U.S. patent application Ser. No. 13/953,595, entitled "APPARATUS AND METHODS FOR CONTROLLING OF ROBOTIC DEVICES", filed Jul. 29, 2013, Ser. No. 14/040,520, entitled "APPARATUS AND METHODS FOR TRAINING OF ROBOTIC CONTROL ARBITRATION", filed Sep. 27, 2013, co-owned and co-pending U.S. patent application Ser. No. 14/088,258, entitled "DISCREPANCY DETECTION APPARATUS AND METHODS FOR MACHINE LEARNING", filed Nov. 22, 2013, co-owned and co-pending U.S. patent application Ser. No. 14/070,114, entitled "APPARATUS AND METHODS FOR ONLINE TRAINING OF ROBOTS", filed Nov. 1, 2013, co-owned and co-pending U.S. patent application Ser. No. 14/070,239, entitled "REDUCED DEGREE OF FREEDOM ROBOTIC CONTROLLER APPARATUS AND METHODS", filed Nov. 1, 2013, co-owned and co-pending U.S. patent application Ser. No. 14/070,269, entitled "APPARATUS AND METHODS FOR OPERATING ROBOTIC DEVICES USING SELECTIVE STATE SPACE TRAINING", filed Nov. 1, 2013, and co-owned U.S. patent application Ser. No. 13/841,980 entitled "ROBOTIC TRAINING APPARATUS AND METHODS", filed on Mar. 15, 2013 and issued as U.S. Pat. No. 8,996,177 on Mar. 31, 2015, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Field

The present disclosure relates to trainable modular robotic devices.

2. Description of the Related Art

Existing robotic devices may comprise a robotic platform (e.g., a body, a remote control (RC) car, a rover, and/or other platforms) and one or more actuators embodied within the robotic platform, and an electronics module configured to control operation of the robotic device. The electronics module may be a printed circuit board with onboard integrated circuits (processors, flash memory, random access memory (RAM), and/or other), connectors for power, sensor, actuator interface and/or data input/output.

One example of a robotic device is the Rover App-Controlled Wireless Spy Tank by Brookstone® which is a popular mobile rover comprising a controller, a movement motor, a microphone, camera(s), wireless interface, battery, and other components embedded within the rover body. A user, desiring a different rover body functionality and/or body shape may be required to purchase a completely new rover (e.g., the Rover 2.0 App-Controlled Wireless Spy Tank). Embedding costly components (e.g., electronics, sensors, actuators, radios, and/or other components) within the robot's body may deter users from obtaining additional robotic bodies and reduce the reuse of costly components in another robot.

Thus, there is a salient need for improved robotic apparatus wherein high-cost components may be packaged in a module that may be interfaced to multiple robotic bodies. Ideally such improved apparatus and methods would also incorporate a highly modular and interchangeable architecture.

SUMMARY

The present disclosure satisfies the foregoing needs by disclosing, inter alia, robotic apparatus and methods.

In one aspect of the present disclosure, an interface for use between components of a robotic apparatus is disclosed. In one embodiment, the interface comprises: a first interface portion comprising a shape; and a second interface portion particularly adapted to interface only with other interface portions comprising the shape; wherein a mating of the first and second interface portions is configured to animate the robotic apparatus via at least a mechanical force transferred over the mated first and second interface portions.

In one variant, the first interface portion comprises a substantially male feature, and the second interface portion comprises a substantially female feature, the substantially male and substantially female features being configured to rigidly but separably attach to one other.

In another variant, the mated first and second interface portions comprise at least one mechanical interface configured to transfer a force, and at least one electrical interface configured to transfer electrical signals or power across the mated first and second interface portions; and the shape comprises a substantially male feature.

In one variant, the interface is configured to provide at least one actuation output to the robotic apparatus, the at least one actuation output comprising first and second portions configured to effectuate movement of a first and a second controllable elements of the robotic apparatus, respectively; and a controller apparatus is configured to operate the robotic apparatus, and the controller apparatus comprises a processor configured to operate an adaptive learning process in order to execute the one or more assigned tasks, the adaptive learning process being characterized by a plurality of trials; the interface; a first actuator and a second actuator each in operable communication with the processor, the first and the second actuators being configured to provide the first and the second portions of the at least one actuation output, respectively; the adaptive learning process is configured to determine, during a trial of the plurality of trials, the at least one actuation output, the at least one actuation output having a first trajectory associated therewith; and the adaptive learning process is further configured to determine, during a subsequent trial of the plurality of trials, another actuation output having a second trajectory associated therewith, the second trajectory being closer to a target trajectory of the one or more assigned tasks than the first trajectory.

In one variant, the first controllable element is configured to effectuate movement of the robotic apparatus in a first degree of freedom (DOF); the second controllable element is configured to effectuate movement of the robotic apparatus in a second DOF independent from the first DOF; and the first and the second portions of the at least one actuation output are configured based on one or more instructions from the processor.

In one variant, the operation of the adaptive learning process by the processor is configured based on one or more computer-executable instructions; and the processor is configured to upload the one or more computer-executable instructions to a computer readable medium disposed external to an enclosure of the controller apparatus.

In another variant, the movement in the first DOF of the first controllable element and the movement in the second DOF of the second controllable element cooperate to effectuate execution of the one or more assigned tasks by the robotic apparatus; the learning process comprises a haptic learning process characterized by at least a teaching input provided by a trainer; and the teaching input is configured based on an adjustment of the first trajectory via a physical contact of the trainer with the robotic apparatus.

In one variant, the adjustment of the first trajectory is configured based at least on an observation of a discrepancy between the first trajectory and the target trajectory during the trial; and the adjustment of the first trajectory is configured to cause a modification of the learning process so as to determine a second control input configured to transition the first trajectory towards the target trajectory during another trial subsequent to the trial.

In one variant, the modification of the learning process is characterized by a determination of one or more values by the processor; the controller apparatus is further configured to provide the another actuation output to another robotic apparatus, the another actuation output being configured to effectuate movement of the another apparatus in a first DOF; and the another actuation output is configured based on the one or more values.

In yet another variant, a detachable enclosure is configured to house a camera adapted to provide sensory input to the processor, the sensory input being used for determination of the at least one actuation output in accordance with a target task, and the one or more instructions are configured based on at least the sensory input.

In a further variant, the processor is configured to receive an audio input, the audio input being used for determining the at least one actuation output in accordance with a target task, and the one or more instructions are configured based on at least the audio input.

In one variant, a detachable enclosure is configured to house a sound receiving module configured to effectuate provision of the audio input to the processor; and the audio input is configured based at least on a command of a trainer.

In a further variant, a detachable enclosure is configured to house one or more inertial sensors configured to provide information related to a movement characteristic of the robotic apparatus to the processor; and the one or more instructions are configured based at least on the information.

In another variant, the processor is configured to determine a displacement of a first joint and a second joint associated, respectively, with the movement of the first controllable element in a first degree of freedom (DOF) and the movement of the second controllable element in a second DOF.

In one variant, the determination of the displacement is configured based at least on feedback information provided from the first and second actuators to the processor, and the feedback information comprises one or more of actuator displacement, actuator torque, and/or actuator current draw.

In yet another variant, the robotic apparatus comprises an identifier configured to convey information related to a configuration of the robotic apparatus; and the adaptive learning process is configured to adapt a parameter based on receipt of the information, the adaptation of the parameter being configured to enable the adaptive learning process to adapt the at least one actuation output consistent with the configuration of the robotic apparatus.

In one variant, the configuration information comprises a number of joints of the robotic apparatus; the information comprises a number and identification of degrees of freedom of the joints of the robotic apparatus; the actuation output configured consistent with the configuration of the robotic apparatus comprises an output configured to operate one or more joints of the robotic apparatus in a respective degree of freedom; and the adaptation of the parameter is configured based on one or more instructions executed by the processor, the one or more instructions being related to two or more of the degrees of freedom of the joints of the robotic apparatus.

In another variant, the robotic apparatus is operable to execute one or more assigned tasks, the robotic apparatus comprising a control module configured to mate to an otherwise inoperable robotic body having one or more degrees of freedom, the control module further configured to produce one or more inputs and communicate the one or more inputs with the robotic body to enable it to conduct the one or more assigned tasks using at least one of the one or more degrees of freedom.

In one variant, the control module comprises a learning apparatus capable of being trained to execute the one or more assigned tasks via at least feedback; wherein the robotic apparatus is configured to train the learning apparatus to perform the one or more assigned tasks via the at least feedback.

In another variant, the control module comprises one or more motive sources, and the one or more inputs comprise one or more mechanical force inputs.

Further features and various advantages will be apparent from the accompanying drawings and the following detailed description.

BRIEF DESCRIPTION OF THE DRAWINGS

FIG. 2B is a graphical illustration depicting an autonomy module configured to interface with a robotic toy plane body, in accordance with one implementation.

FIG. 3B is a graphical illustration depicting a robotic toy plane body comprising the autonomy module of FIG. 2B, in accordance with one implementation.

Figure 1:
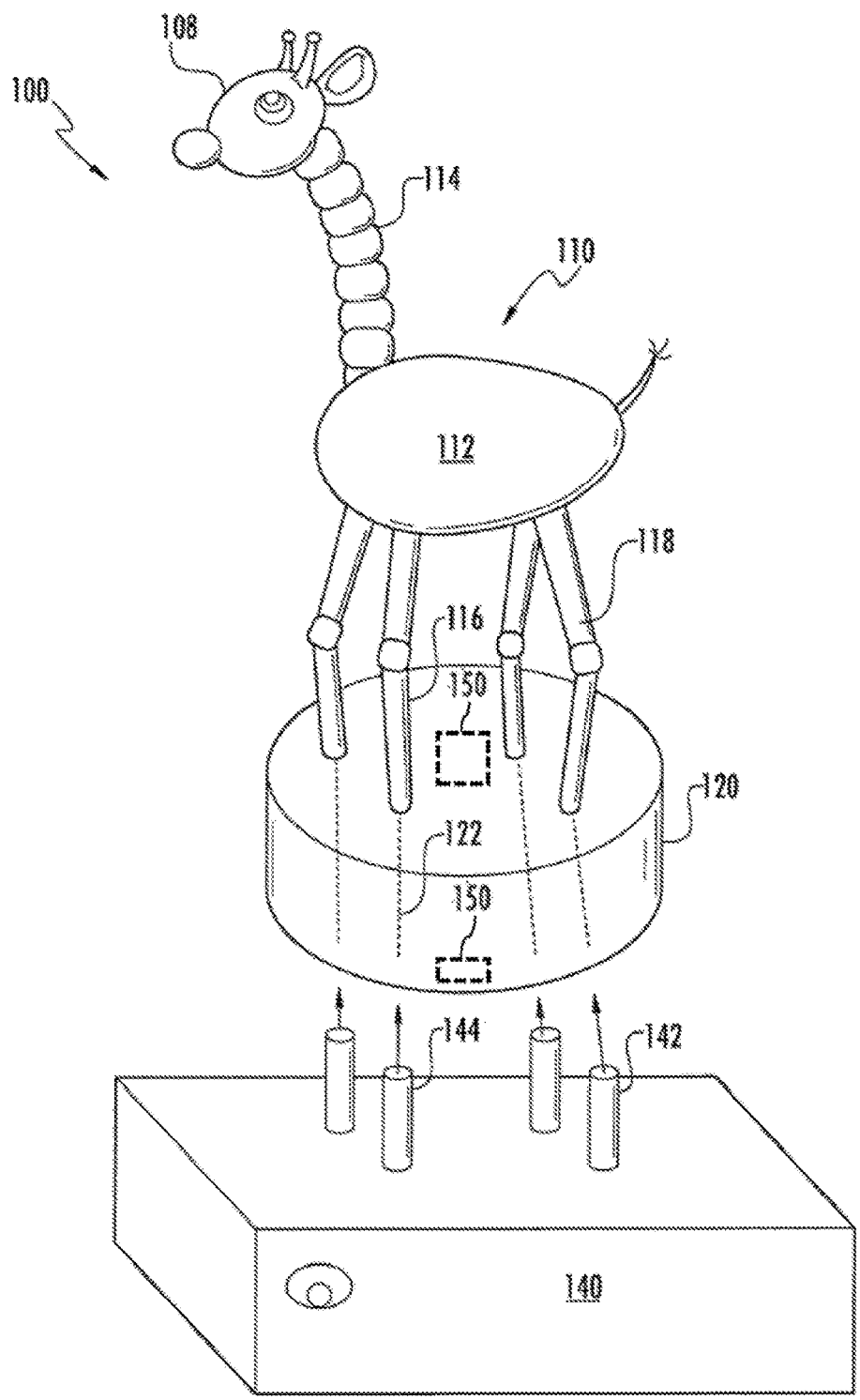
FIG. 1 is a graphical illustration depicting a robotic toy comprising an autonomy module in accordance with one implementation.

All Figures disclosed herein are © Copyright 2014 Brain Corporation. All rights reserved.

DETAILED DESCRIPTION

Implementations of the present disclosure will now be described in detail with reference to the drawings, which are provided as illustrative examples so as to enable those skilled in the art to practice the principles and architectures described herein. Notably, the figures and examples below are not meant to limit the scope of the present disclosure to a single embodiment or implementation, but other embodiments and implementations are possible by way of interchange of or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present disclosure will be described, and detailed descriptions of other portions of such known components will be omitted so as not to obscure the principles and architectures described herein.

In the present specification, an embodiment or implementation showing a singular component should not be considered limiting; rather, the disclosure is intended to encompass other embodiments or implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that are used to access the synaptic and neuron memory. The "bus" could be optical, wireless, infrared or another type of communication medium. The exact topology of the bus could be for example a standard "bus", hierarchical bus, network-on-chip, address-event-representation (AER) connection, or other type of communication topology used for accessing e.g., different memories in a pulse-based system.

As used herein, the terms "computer", "computing device", and "computerized device", include, but are not limited to, personal computers (PCs) and minicomputers, whether desktop, laptop, or otherwise, mainframe computers, workstations, servers, personal digital assistants (PDAs), handheld computers, embedded computers, programmable logic devices, personal communicators, tablet computers, portable navigation aids, cellular telephones, smart phones, personal integrated communication or entertainment devices, or any other devices capable of executing a set of instructions and processing an incoming data signal.

As used herein, the term "program", "computer program" or "software" is meant to include any sequence of human or machine cognizable steps which perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java™ (including J2ME, Java Beans, and/or other), Binary Runtime Environment (e.g., BREW), and the like.

As used herein, the term "memory" includes any type of integrated circuit or other storage device adapted for storing digital data including, without limitation: ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "microprocessor" and "digital processor" are meant generally to include all types of digital processing devices including, without limitation: digital signal processors (DSPs), reduced instruction set computers (RISC), general-purpose (CISC) processors, microcontrollers, microprocessors, gate arrays (e.g., field programmable gate arrays (FPGAs)), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the term "network interface" refers to any signal, data, or software interface with a component, network or process including, without limitation: those of the IEEE Std. 1394 (e.g., FW400, FW800, and/or other), USB (e.g., USB2), Ethernet (e.g., 10/100, 10/100/1000 (Gigabit Ethernet), Thunderbolt™, 10-Gig-E, and/or other), Wi-Fi (802.11), WiMAX (802.16), PAN (e.g., 802.15), cellular (e.g., 3G, LTE/LTE-A/TD-LTE, GSM, and/or other) or IrDA families.

As used herein, the term "Wi-Fi" refers to, without limitation: any of the variants of IEEE-Std. 802.11 or related standards including 802.11 a/b/g/n/s/v.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, and/or other), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

Existing robotic device systems often have limited modularity, in part because most cost-bearing components are tightly integrated with the body of the robot. Barebones control boards, while offering flexibility in structure, may require significant engineering skill on the part of the user in order to install and integrate the board within a robot.

It will be apparent in light of the present disclosure, that the aforementioned problem may be addressed by a modular robotic device architecture configured to separate all or most high cost components into one or more module(s) that is separate from the rest of the robotic body. By way of illustration, a robotic toy stuffed animal (e.g., a teddy bear) autonomy module (configured to control head and limb actuators, sensors, and a communication interface, and/or other components.) may be configured to interface with the body of the robotic toy stuffed bear. In one embodiment, the autonomy module may comprise linear actuators with sensory feedback that may be connected to tendons within the bear limbs. In one or more implementations, the tendons may comprise one or more of a rope, a string, elastic, a rubber cord, a movable plastic connector, a spring, a metal and/or plastic wire, and/or other connective structure. During training and/or operation, the controller may position limbs of the toy in a target position. A user may utilize a haptic training approach (e.g., as described for example, in U.S. patent application Ser. No. 14/102,410, entitled "APPARATUS AND METHODS FOR HAPTIC TRAINING OF ROBOTS", filed on Dec. 10, 2013, incorporated supra) in order to enable the robotic toy to perform one or more target action(s). During training, the user may apply corrections to the state of the robotic body (e.g., limb position) using physical contact (also referred to as the haptic action). The controller within the autonomy module may utilize the sensory feedback in order to determine user interference and/or infer a teaching signal associated therewith. Modular configuration of the disclosure enables users to replace one toy body (e.g., the bear) with another (e.g., a giraffe) while using the same hardware provided by the autonomy module.

Consolidation of high cost components (e.g., one or more processing modules, power conditioning and supply modules, motors with mechanical outputs, sensors, communication modules, and/or other components) within the autonomy module alleviates the need to provide high cost components within a body of a robot thereby enabling robot manufacturers to reduce the cost of robotic bodies. Users may elect to purchase a single autonomy module (also referred to throughout as an AM) with e.g., two or more inanimate robotic bodies, vehicles, and/or other bodies thereby reducing overall cost of ownership and/or improving user experience. Each AM may interface with existing electro-mechanical appliances thus enabling user to extract additional value from their purchase of an AM.

DETAILED DESCRIPTION OF THE EXEMPLARY IMPLEMENTATIONS

Exemplary implementations of the various facets of the disclosure are now described in detail. It will be appreciated that while described substantially in the context of modular robotic devices, the present disclosure is in no way so limited, the foregoing merely being but one possible approach. The principles and architectures described herein are contemplated for use with any number of different artificial intelligence, robotic or automated control systems.

FIG. 1 illustrates a robotic toy comprising an autonomy module (AM) configured in accordance with one implementation. The toy 100 of FIG. 1 comprises a body 110 and the AM 140. As shown, the body 110 comprises the inanimate figurine of a giraffe, although it is appreciated that implementations may widely vary (e.g., other animals, an action figure (e.g., Mickey Mouse®), and/or other) The figurine 110 may comprise one or more limbs (e.g., 116, 118) attached to a body 112. The individual limbs (e.g., 116) may be controlled via tendons embodied there within. Head 108 of the figurine 110 may be controlled via a tendon embodied within the neck 114. In some implementations, the robotic body may comprise one or more swappable limbs, and/or other body parts. The head 108 may comprise one or more cameras (not shown) configured to provide sensory input into the autonomy module 140. The sensory input may be used to e.g., implement stereo vision, object recognition (e.g., face of the user), control the head 108 to track an object (e.g., the user's face), and/or other applications.

The autonomy module (AM) 140 provides sensory, motor, and learning functionality associated with performing one or more tasks by the robotic toy 100 (e.g., dance, bend, turn, and/or other). The AM may comprise one or more actuators configured to operate the tendons of the figurine 110. The AM may further comprise a processing module configured to execute an adaptive control application (also referred to as controller) in order to manipulate the actuator interfaces 142, 144. In some implementations, the actuators of the AM 140 may provide mechanical activation signal, e.g., rotational and/or translational motion via the interfaces 142, 144 to the controllable elements of the body 110. In one or more implementations, the actuators of the AM 140 may comprise one or more solenoids and actuator operation may comprise application of electromagnetic energy. The controller may be programmable and/or teachable, for example through standard machine learning algorithms, such as supervised learning, unsupervised learning, and reinforcement learning. The controller may be trained by the manufacturer of the robot and/or by the end user of the robot. In some implementations, the AM may house all motor, sensory, power, and processing components needed to operate one or more robotic bodies.

The figurine base 120 may be adapted to interface tendons to actuators within the AM 140, as shown by broken line 122 in FIG. 1. The adaptive control application may enable the apparatus 100 to perform the one or more tasks. In some implementations, the AM may comprise sensors (wired and/or wireless), power module (e.g., an internal battery), communication module, storage and/or other modules. The actuators of the AM module 140 may feature sensory feedback mechanisms (effectuated using, e.g., interfaces 142, 144) configured to enable the controller to determine the state of tendons within the figurine. In one or more implementations, the feedback may comprised one or more of actuator position, velocity, force, torque, jerk, and/or other.

In some implementations, the AM 140 may comprise one or more sound wave and/or electromagnetic wave (e.g., radio frequency (RF)) sensing modules (not shown). An audio interface may be utilized in order to receive user generated auditory input during training and/or operation. The AM 140 may comprise one or more inertial motion sensors (e.g., 1, 2, 3 axis gyroscopes, accelerometers (e.g., micro-electrical mechanical systems (MEMS)), ultrasonic proximity sensors and/or other sensors that may be useful for determining the motion of the robot's body.

In implementations targeted at cost-conscious consumers, the robotic toy body (e.g., the figurine 110) may be available without sensors, actuators, processing, and/or power modules. In some implementations, wherein additional costs may be acceptable to users, the robotic body may be outfitted with additional sensors and/or motor actuators that may interface to the AM via one or more connectors (e.g., as shown and described in greater detail hereinafter).

In one or more implementations, an autonomy module (e.g., AM 140 in FIG. 1) may be implemented using a reconfigurable architecture where a given AM may be utilized with two or more types of robotic bodies. One such exemplary implementation is shown and described below with respect to FIGS. 2A-3B.

Figure 2A:
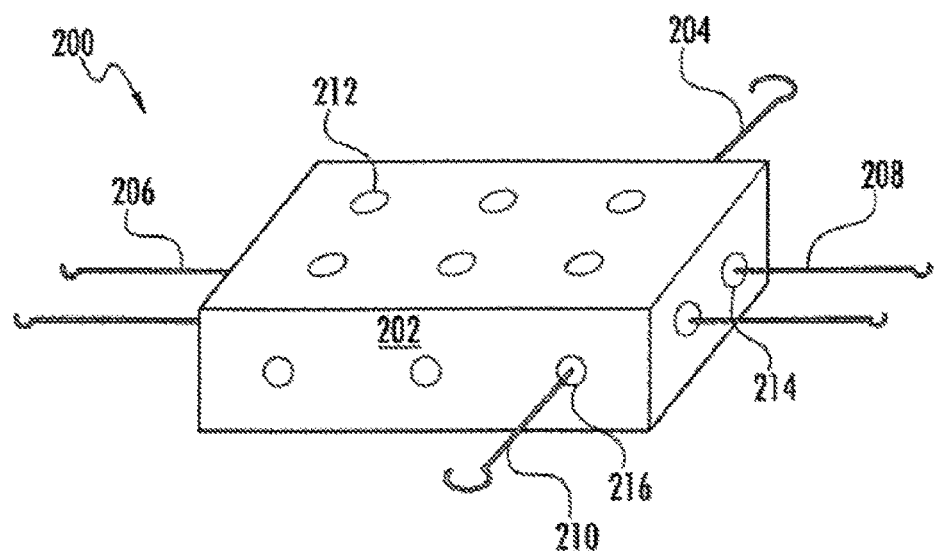
FIG. 2A is a graphical illustration depicting an activation module configured to interface with a robotic toy stuffed bear body, in accordance with one implementation.

FIG. 2A illustrates an implementation of an autonomy module (AM) configured to interface with a robotic toy stuffed animal body. The AM 200 may comprise one or more actuator ports 212, 214, 216 embodied within enclosure 202. The enclosure 202 may house processing, power (e.g., an internal battery), sensor, communication, storage, and/or modules (e.g. as described above with respect to FIG. 1). One or more actuator ports (e.g., the ports 214, 216) may be adapted to interface to an external control element (e.g., a tendon in the toy body), via one or more mechanical and/or electromechanical interfaces 204, 206, 208, 210. It will be appreciated by those skilled in the arts that number and/or location of the interfaces is determined in accordance with a specific configuration of a body being used with the AM that may change from one body to another.

Figure 3A:
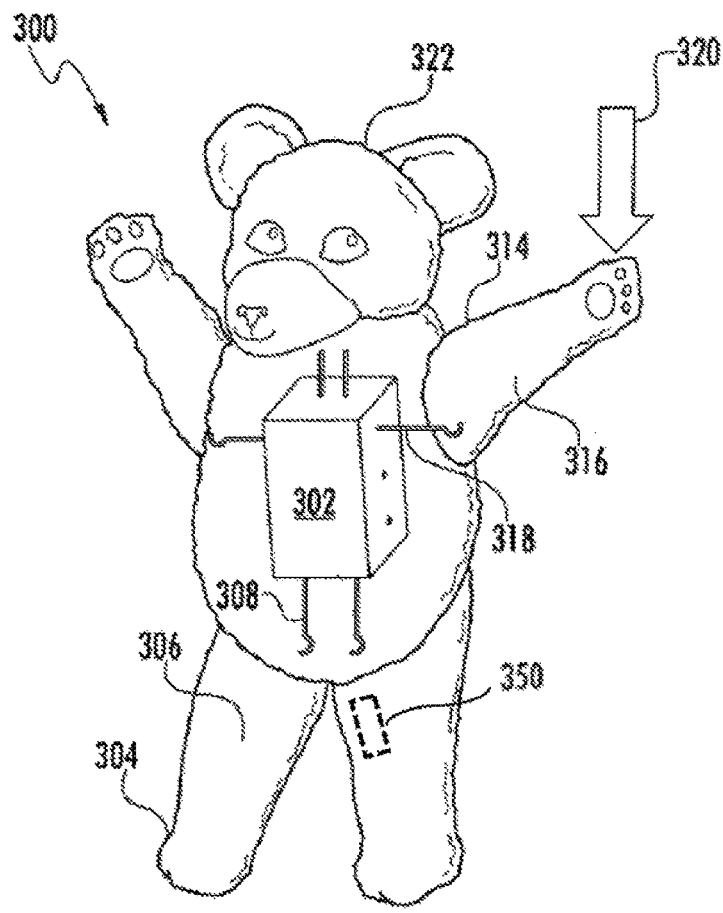
FIG. 3A is a graphical illustration depicting a robotic toy stuffed bear body comprising the autonomy module of FIG. 2A, in accordance with one implementation.

FIG. 3A illustrates the AM 200 of FIG. 2A disposed within a robotic toy stuffed bear body, in accordance with one implementation. The toy 300 comprises a body having a head and four limbs. Individual limbs (e.g., 304, 314) and/or the head 322 may be attached to connective structures (tendons) e.g., 316, 306 in FIG. 3A. The tendons 306, 316 may be retracted and/or loosened (typically, with a complementary counterpart tendon) in order to induce motion of the limbs. While the aforementioned tendons 306, 316 are envisioned as being flexible, it is appreciated that semi-rigid, and rigid structures may be used with equal success. An autonomy module may be installed within the body cavity. In some implementations, the AM 302 may comprise the AM 200 described above with respect to FIG. 2A. The AM 302 may comprise interfaces 308, 318 adapted to couple to actuators (not shown) within the AM to the tendons (e.g., 306, 316). One or more of the AM actuators may comprise feedback actuators enabling the AM controller to receive feedback about the state of a respective limb. In some implementations, the feedback actuators may enable the AM controller to determine an external influence (e.g., a force shown by arrow 320) applied by a user to a limb in order to facilitate learning.

The body 300 and head 322 may comprise one or more cameras and/or optical interfaces (not shown) configured to provide sensory input to the autonomy module 302. The sensory input may be used to e.g., implement stereo vision, object recognition (e.g., face of the user), control the head 322 to track an object (e.g., user's face), and/or other applications.

Various implementations may enable different types of bodies with the same AM module (for example, body 110 of FIG. 1 may operate with the same AM as body 340 of FIG. 3B, and/or other). In some instances, the AM module may be characterized by a plurality of controllable degrees of freedom that it can support. As used herein, the "degree(s) of freedom" (DOF) refers to a number of independent parameters that define the configuration of the body. By way of an illustration, a position of a rigid body in space may be defined by three components of translation and three components of rotation, corresponding to a total of six independent degrees of freedom. In another such example, the spinning blade of an electric food processor may be characterized by a single degree of freedom (e.g., rotation around a vertical axis) even though different mechanical attachments may be coupled to the motor of the food processor.

In one or more implementations, individual ones of the plurality of robotic bodies that may interface to a given AM module (e.g., the module 260 of FIG. 2C) may be characterized by a characteristic individual number of DOF, DOF configuration (e.g., one body by a position in a number of dimensions (1, 2, 3, and/or other), and another body by limb position, and/or other characteristic DOF), characteristic kinematic chain (that differs from one body to another), and/or other. As used herein, a "kinematic chain" generally refers to an assembly of rigid bodies connected by joints that are independently controlled. A kinematic chain may also refer to the mathematical model for such a mechanical system.

FIG. 2B illustrates an autonomy module configured to interface with a robotic toy plane body, in accordance with one implementation. The AM 240 may comprise the module 120 or the module 200, described above with respect to FIGS. 1, 2A. The autonomy module 240 may comprise one or more actuator ports 246, 250 embodied within enclosure 242. The enclosure 242 may house processing, power, sensor, communication, storage, and/or modules (such as those previously described). One or more actuator ports (e.g., the port 250 in FIG. 2B) may be adapted to interface to an external control element (e.g., a rudder control cable), via one or more mechanical and/or electromechanical interfaces 244, 248.

FIG. 3B illustrates the AM 240 of FIG. 2B disposed within a robotic toy plane body, in accordance with one implementation. The toy plane 340 may comprise one or more controllable surfaces (e.g., elevator 356, aileron 358, and/or other) and a propeller 354. Individual control surfaces (e.g., 356, 358) may be coupled to the AM via one or more cables (e.g., 346 in FIG. 3B). In one or more implementations, the cables 346 may carry mechanical signals (e.g., push/pull/rotate) and/or electrical signals (up/down) to the respective control surface(s). The propeller 354 may be coupled to the AM via a shaft 344. In some implementations, the AM 342 may comprise the AM 240 described above with respect to FIG. 2B. One or more of the AM actuators may comprise feedback actuators enabling the AM controller to receive feedback about state of a respective control surface and/or the propeller 354. In some implementations, the feedback actuators may enable the controller of the AM 342 to determine an external influence applied by a user to a controllable element of the plane in order to facilitate learning.

In some implementations, the AM described herein may be utilized in order to upgrade (retrofit) a remote controlled (RC) aerial vehicle (e.g., a plane, a blimp) wherein the original RC receiver may be augmented and/or replaced with the learning AM thereby turning the RC plane into an autonomous trainable aerial vehicle.

Figure 2C:
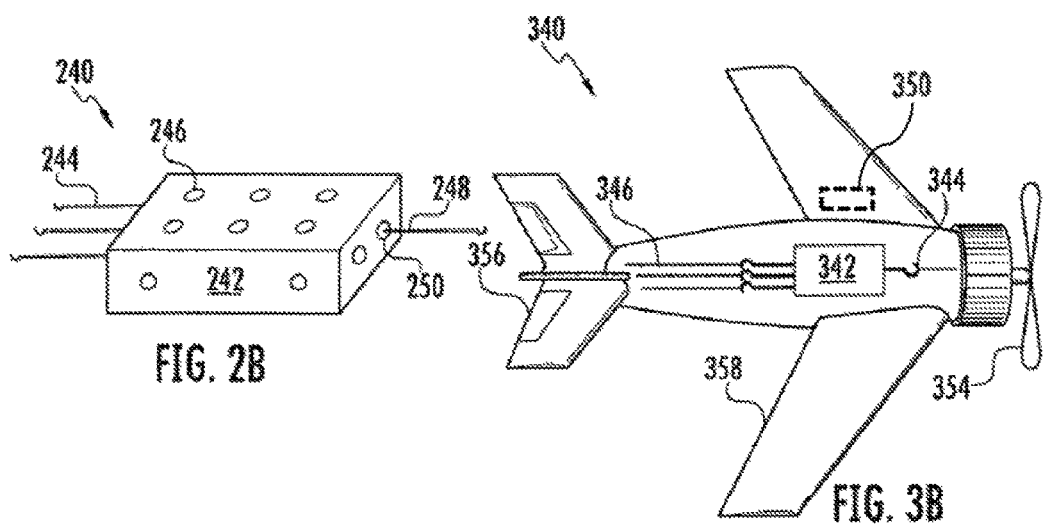
FIG. 2C is a graphical illustration depicting an autonomy module configured to interface with a robotic toy plane body and/or robotic toy stuffed bear body, in accordance with one implementation.
Figure 2C:
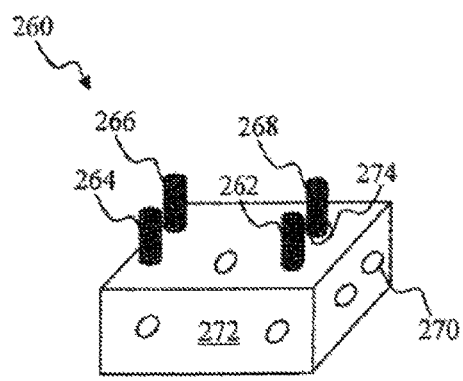

In another embodiment, FIG. 2C illustrates an autonomy module configured to interface with a robotic toy plane body (e.g., the robotic toy plane body 340 of FIG. 3B) and/or robotic animal body (e.g., the giraffe figurine 110 of FIG. 1), in accordance with one implementation. The AM 260 of FIG. 2C may comprise one or more actuator ports 274 embodied within enclosure 272. The enclosure 272 may house processing, power, sensor, communication, storage, and/or modules (such as those previously described). One or more actuator ports (e.g., the port 274 in FIG. 2C) may be adapted to interface to an external control element (e.g., a rudder control cable), via one or more mechanical and/or electromechanical interfaces 262, 264, 266, 268. By way of an illustration of interfacing to the plane body 340 of FIG. 3B, the interface 264 may be interfaced to rudder control elements 346, the interfaces 262, 266 may be interfaced to the aileron 358; and the interface 268 may be interfaced to the motor control 344. In one or more implementations, where the robotic body (e.g., a motorized rover) may consume energy in excess of the AM power module (e.g., the internal battery) capability, the robotic body may also comprise a power module (e.g., an external battery, a solar cell, a fuel cell, and/or other).

Autonomy module (e.g., AM 140, AM 200, AM 240, AM 260 may be configured to provide a mechanical output to one or more robotic bodies (e.g., giraffe figurine 110, stuffed bear 300, toy plane 340). In one or more implementations, the mechanical output may be characterized by one or more of a rotational momentum, a linear velocity, an angular velocity, a pressure, a linear force, a torque, and/or other parameter. The coupling mechanism between an AM and the body may comprise a mechanical, electrical, and/or electromechanical interface optimized for transmission of relevant parameters. In some variants, the coupling may be proprietary or otherwise specific to application; in other variants, the coupling may be generic. In some implementations, the portions of the coupling interface between the AM and the body may be configured to be mechanically adjusted relative one another (e.g., via a slide-rotate, extend/contract, and/or other motion) in order to provide sufficient target coupling.

In some implementations, a user, and/or a manufacturer modify (and/or altogether remove) the AM enclosure in order to attain target performance of the robot. By way of an illustration, the user may elect to remove the enclosure 272 of FIG. 2C when placing the AM 260 inside the toy plane body 340 in order to, for example, reduce the overall plane weight. However, the electromechanical interface between the AM actuators and body controllable elements (e.g., the motor 354 and control planes 358, 356) may remain unchanged in order to ensure target coupling between the AM and the body.

Robotic bodies may comprise an identification means (e.g., element 150 of FIG. 1, element 350 of FIGS. 3A and 3B), configured to convey information related to one or more of: the body type (e.g., toy figure, plane, and/or other), kinematic configuration (e.g., number of movable joints of a manipulator, number and/or location of actuator attachments, and/or other.), body model (e.g., giraffe, bear, lion, and/or other.) and/or other information to the AM. In some implementations, the identification means may comprise a mechanical or electromechanical module (e.g., a plug, a socket with a predefined number of electrical connections (e.g., pins)). By way of illustration, the identification means may comprise a coupling mechanism, configured to couple in one of a plurality positions corresponding to a plurality of body types. The AM portion of the coupling may comprise an electronic read out means configured to communicate the body type information to the processing module (as described in greater detail hereinafter). In one or more implementations, the identification means may comprise an electrical module (e.g., radio frequency identification (RFID) tag (e.g., 150, 350), a silicon serial number memory chip (e.g., DS2401 by Maxim Integrated™) (e.g., 150, 350) in data communication with the AM. In some implementations, upon determining that a present body (e.g., a toy plane) attached to the AM does not match the AM control process (e.g., due to a different kinematic configuration of the present body relative to a kinematic configuration of the control process) the AM may initiate download of a control process (e.g., computational brain image) matching the current body. The control process update may commence automatically without user intervention, may prompt a user for confirmation, and/or may prompt the user to perform manual update.

Figure 4A:
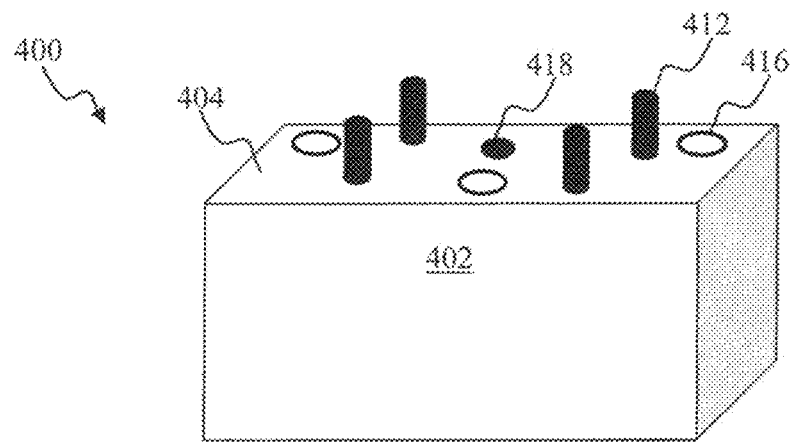
FIG. 4A is a functional block diagram illustrating a one-sided autonomy module in accordance with one implementation.

FIGS. 4A-5B illustrate various embodiments of autonomy module implementations useful with modular learning robotic devices. The autonomy module 400 of FIG. 4A comprises one or more actuators embodied within enclosure 402. The enclosure 402 may house processing, power, sensor, communication, storage, and/or modules (such as those previously described). Actuators of the AM 400 may be accessible via one or more actuator ports 418 denoted by solid circles in FIG. 4A. One or more of the ports 418 may be adapted to interface to an external control element (e.g., a tendon in a toy body), via one or more mechanical and/or electromechanical interfaces 412. In one or more implementations, the interface 412 may comprise a gear wheel, a coupling (e.g., a snap fit, tooth coupling (e.g., Hirth joint)), a shaft, a spline, a tube, a screw, an axle, a connector, a cable, and/or other coupling. The AM 400 may comprise one or more coupling elements 416 denoted by open circles in FIG. 4A. In one or more implementations, the coupling elements 416 may be configured to transmit and/or receive electrical, magnetic, electromagnetic, pressure, and/or other signals to and from elements of a robotic body. By way of an illustration, the coupling element 416 may be configured to provide DC power to an actuator and/or a sensor, and/or sense air pressure due to a squeezing of the robotic body by user. The AM configuration of FIG. 4A is characterized by a single active side (e.g., the top horizontal surface 404 in FIG. 4A). The AM 400 may be utilized with thumb puppets (e.g., giraffe 110 shown in FIG. 1) wherein controls disposed on a single side may be sufficient for operating the toy.

Figure 4B:
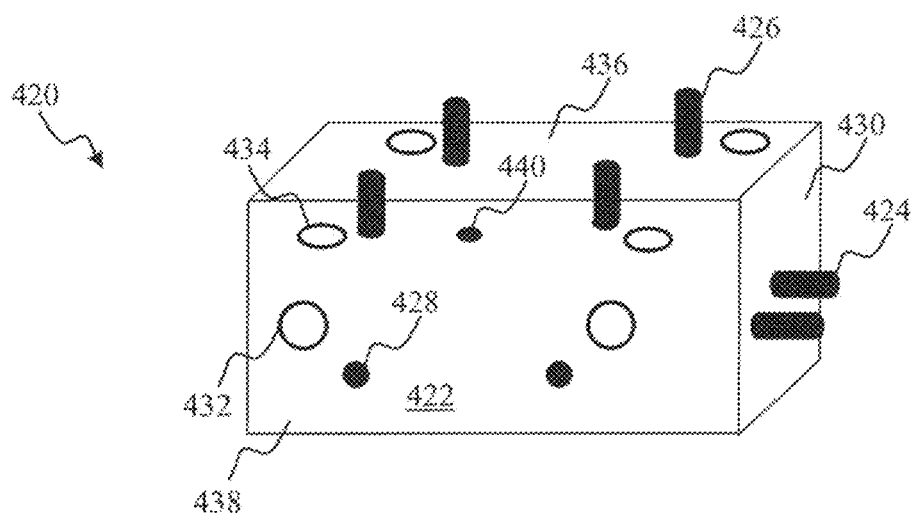
FIG. 4B is a functional block diagram illustrating a multi-sided autonomy module in accordance with one implementation.

FIG. 4B illustrating a multi-active sided autonomy module in accordance with one implementation. The AM 420 configuration of FIG. 4B is characterized by control and/or sensing elements being disposed on two or more sides of the AM enclosure 422 (e.g., the top horizontal surface 436, vertical surfaces 430, 438 in FIG. 4B). The AM 420 may be utilized with robotic bodies wherein controllable elements may be disposed along two or more surfaces in 3-dimensions (e.g., the stuffed animal bear 300, the toy plane 340 of FIGS. 3A-3B, respectively, and/or other configurations).

The autonomy module 420 of FIG. 4B may comprise one or more actuators embodied within enclosure 422. The enclosure 422 may house processing, power, sensor, communication, storage, and/or modules (such as those previously described). Actuators of the AM 420 may be accessible via one or more actuator ports 428 denoted by solid circles in FIG. 4B. One or more actuator ports may be adapted to interface to an external control element (e.g., a tendon in a toy body), via one or more mechanical and/or electromechanical interfaces 426, 424. In one or more implementations, the interfaces 426, 424 may comprise a gear wheel, a coupling (e.g., a snap fit, tooth coupling (e.g., Hirth joint)), a shaft, a spline, a tube, a screw, an axle, a connector, a cable, and/or other element. The AM module may be configured to provide a mechanical output to one or more robotic bodies. In one or more implementations, the mechanical output may be characterized by one or more of rotational momentum, a linear velocity, an angular velocity, a pressure, a linear force, a torque, and/or other parameter.

The AM 402 may comprise one or more coupling elements 432 denoted by open circles in FIG. 4B. In one or more implementations, the coupling elements 432 may be configured to transmit and/or receive electrical, magnetic, electromagnetic, pressure, and/or other signals to and from elements of a robotic body e.g., as described above with respect to FIG. 4A.

Figure 5A:
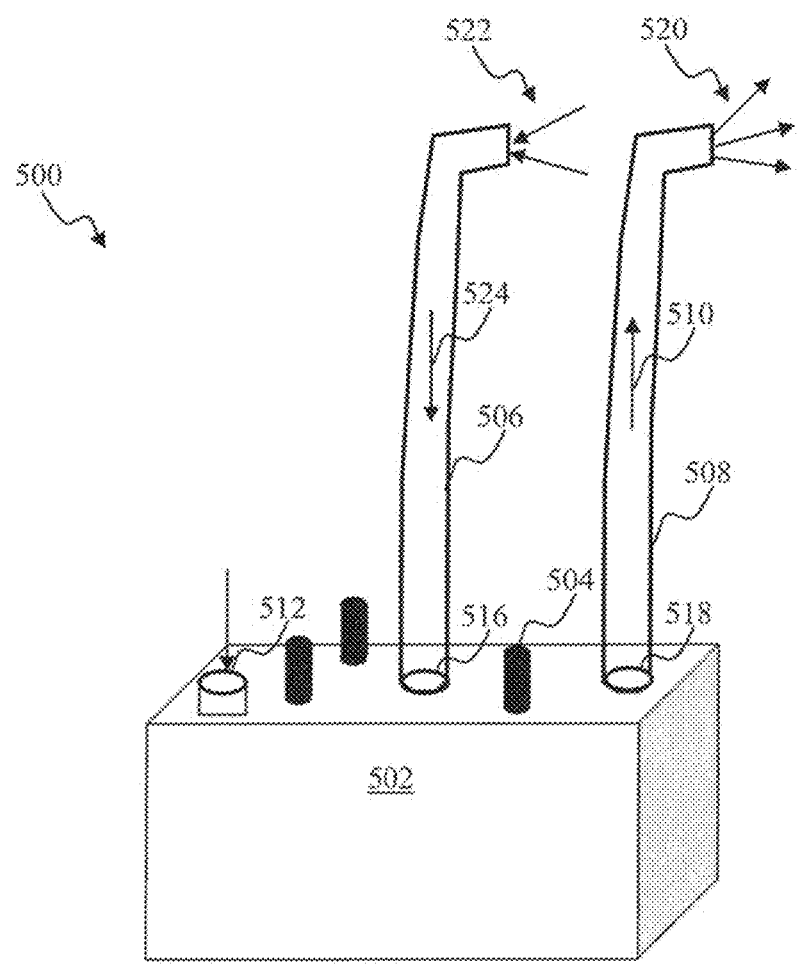
FIG. 5A is graphical illustration depicting an autonomy module comprising a visual interface, in accordance with one implementation.

FIG. 5A illustrates an autonomy module comprising a visual interface in accordance with one implementation. The autonomy module 500 of FIG. 5A comprises one or more actuators 504 embodied within enclosure 502. The enclosure 502 may house processing, power, sensor, communication, storage, and/or modules (such as those previously described). The AM 500 may comprise one or more light sensing modules 516, 512. In some implementations, the module 512 may comprise Charge Coupled Device (CCD) sensors, complementary metal oxide semiconductor (CMOS) sensors, photodiodes, color sensors, infrared (IR) and/or ultraviolet (UV) sensor, or other electromagnetic sensor. The module 512 may comprise a lens configured to focus electromagnetic waves (e.g., visible, IR, UV) onto the sensing element of the module 512. In some implementations, the AM 500 may comprise one or more sound wave and/or electromagnetic wave (e.g., radio frequency (RF)) sensing modules (not shown). An audio interface may be utilized in order to receive user auditory input during training and/or operation.

The one or more modules 512, 516 may provide sensory input. The sensory input may be used to e.g., implement stereo vision, perform object recognition (e.g., face of the user), control the robot's body in order to, for example, track an object (e.g., user's face), and/or other applications.

In some implementation, the sensing module (e.g., 516) may be coupled to an optical interface 506 (e.g., a waveguide, one or more mirrors, a lens, a light-pipe, a periscope, and/or other means). The interface 506 may conduct ambient light 522 (with respect to the enclosure 502) in a direction shown by arrow 524 to the sensing module 516. The AM 500 may comprise one or more light emitting modules e.g., 518. In some implementations, the module 512 may comprise a light emitting diode (LED), a laser, and/or other light source. Output of the module 518 may be communicated via optical waveguide 508 (as shown by arrow 510) to a target location 520 (e.g., eye) within the robotic body. In one or more implementations, the light emitting and receiving sensors may be combined into a single module that may share one or more components e.g., the lens and/or the input/output waveguide. In some implementations, the optical waveguide functionality may be implemented using one or more reflective surfaces (e.g., optical mirrors), transparent or translucent media, and/or other means. The AM 500 may be employed with a toy robot comprising eyes, and/or light indicators. Use of a camera module 512, 516 may enable visual sensory functionality in the robot. The AM may acquire and form a hierarchy of sensory (e.g. visual or multi-sensory) features based on the observed spatio-temporal patterns in its sensory input, with or without external supervision. Sensory processing may be implemented using e.g., spiking neuron networks described, for example, in U.S. patent application Ser. No. 13/623,820, entitled "APPARATUS AND METHODS FOR ENCODING OF SENSORY DATA USING ARTIFICIAL SPIKING NEURONS, filed Sep. 20, 2012, Ser. No. 13/540,429, entitled "SENSORY PROCESSING APPARATUS AND METHODS, filed Jul. 2, 2012, Ser. No. 13/548,071, entitled "SPIKING NEURON NETWORK SENSORY PROCESSING APPARATUS AND METHODS", filed Jul. 12, 2012, and Ser. No. 13/660,982, entitled "SPIKING NEURON SENSORY PROCESSING APPARATUS AND METHODS FOR SALIENCY DETECTION", filed Oct. 25, 2012, each of the foregoing being incorporated herein by reference in its entirety.

The AM 500 may utilize a predictive capacity for the sensory and/or sensory-motor features. Predictive-based vision, attention, and feature selection based on relevance may provide context used to determine motor activation and/or task execution and planning Some implementations of sensory context for training and predicting motor actions are described in U.S. patent application Ser. No. 13/842,530, entitled "ADAPTIVE PREDICTOR APPARATUS AND METHODS", filed Mar. 15, 2013, Ser. No. 13/918,338, entitled "ROBOTIC TRAINING APPARATUS AND METHODS", filed Jun. 14, 2013, Ser. No. 13/918,298, entitled "HIERARCHICAL ROBOTIC CONTROLLER APPARATUS AND METHODS", filed Jun. 14, 2013, Ser. No. 13/918,620 entitled "PREDICTIVE ROBOTIC CONTROLLER APPARATUS AND METHODS", filed, Jun. 14, 2013, Ser. No. 13/953,595 entitled "APPARATUS AND METHODS FOR CONTROLLING OF ROBOTIC DEVICES", filed Jul. 29, 2013, each of the foregoing being incorporated herein by reference in its entirety.

In some implementations, the AM 500 may comprise one or more inertial motion sensors (e.g., 1, 2, 3 axis gyroscopes, accelerometers (e.g., MEMS), ultrasonic proximity sensors and/or other sensors that may be useful for determining motion of the robot's body.

Figure 5B:
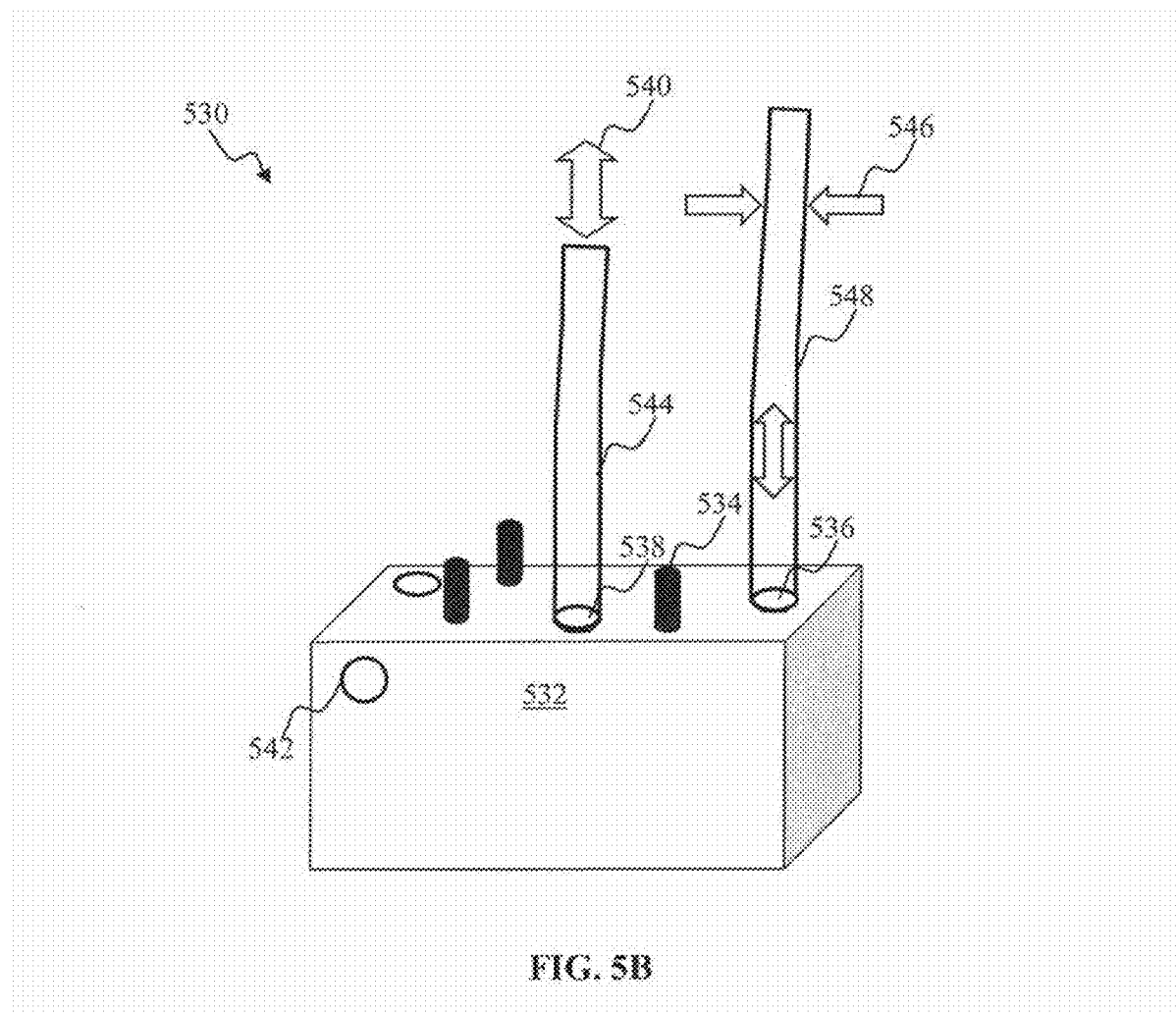
FIG. 5B is graphical illustration depicting an autonomy module comprising a pneumatic actuating and sensing module, in accordance with one implementation.

FIG. 5B illustrates an autonomy module comprising pneumatic actuating and sensing module, in accordance with one implementation. The autonomy module 530 of FIG. 5B comprises one or more actuators 534 embodied within enclosure 532. The enclosure 532 may house processing, power, sensor, communication, storage, and/or modules (such as those previously described). The AM 530 may comprise one or more pressure sensing modules 536, 538. In some implementations, individual pressure sensing modules 536, 538 may comprise a membrane, a piezoresistive (e.g., a micro-actuated micro-suspension (MAMS)), a capacitive, optical, and/or other sensing technology. The pressure sensing modules 536, 538 may be coupled to an air source (e.g., a pump, a compressed gas container, a gas generator, and/or other gas source) thereby providing a flow of gas at the module aperture. In some implementations, the pressure sensing modules 536, 538 may be coupled to an air duct 544, 588 that may transmit gas flow from/to the pressure sensing modules 536, 538. In some robotic toy implementations, the air ducts 544, 588 may be coupled to a robotic body comprising e.g., an inflatable shell. The airflow 540 may be utilized to inflate the shell to a target shape. In one or more implementations of robot training, a user may provide feedback to a learning controller of the AM 530 by applying pressure (e.g., squeezing) the air duct (e.g., as shown by arrows 546) and/or portions of the robotic body.

Figure 6:
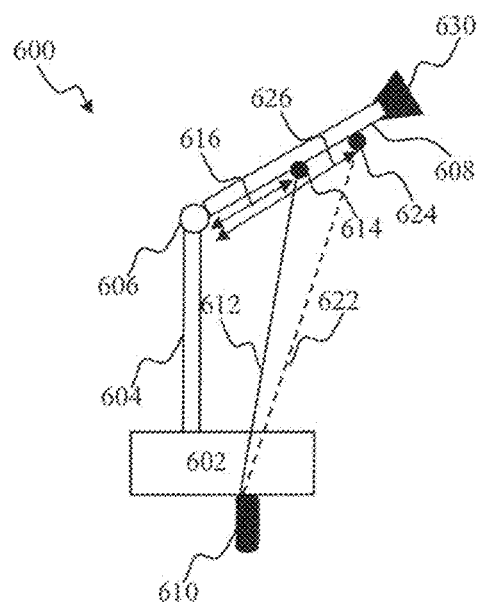
FIG. 6 is a functional block diagram illustrating tendon attachment of a robotic manipulator arm for use with an autonomy module e.g., of FIG. 4A, in accordance with one implementation.

Various methodologies may be employed in order to broaden functionality of the robotic bodies for a given AM. FIG. 6 illustrates a tendon attachment configuration of a robotic manipulator arm for use with autonomy module, in accordance with some implementations. The arm 600 of FIG. 6 comprises two segments 604, 608 coupled via a joint 606. The segment 604 may be attached to base 602 via a fixed or movable coupling. The segment 608 may comprise one or more tendon attachment structures 614, 624 in FIG. 6. In some implementations, the tendon may comprise a rigid structure (e.g., a rod, a shaft). In some implementations, the tendon (e.g., 612) may comprise a flexible structure (e.g., a rope, a string) and the joint 606 may comprise a spring-loaded structure configured to provide a restoring force to the element 608. The structures 614, 624 may be characterized by a distance 616, 626, respectively, from the joint 606. As shown, the solid line 612 denotes a first tendon attachment to the structure 614, and the broken line 626 depicts a second tendon attachment to the structure 624. The other end of the tendon is coupled to an actuator 610 of the AM module. For a given displacement of the actuator 610, the first tendon attachment may produce greater range of motion of the element 608 compared to the second tendon attachment. Conversely, the second tendon attachment may produce greater accuracy of motion control of the element 608, compared to the first tendon attachment. In other words, FIG. 6 illustrates one approach to obtaining multiple motion patterns for a given robotic body-AM combination without necessitating modification of the AM. In one or more implementations, the tendon used with the apparatus 600 may comprise a rigid structure that does not appreciably extend or contract (i.e., so as to enable the actuator to move the arm). In paired tendon configurations (i.e., where a pair of tendons are contracted and slacked), the tendon may be constructed from flexible materials such as e.g., a rope, a string, an elastic, a rubber cord, a movable plastic connector, a spring, a metal and/or plastic wire, and/or other. For example, a spring (not shown) embodied within the AM may be used to control tension of a non-elastic tendon (e.g., line or cable) of the robot.

The arm 600 may comprise a sensing module 630. In some implementations, the element 630 may comprise a video camera configured to provide visual input to a processor of autonomy module. The arm 600 may be controlled to position the module 630 to implement e.g., face tracking. In one or more implementations, the sensing module 630 may comprise a radio frequency (RF) antenna configured to track an object.

In one or more implementations, another arm, characterized by a kinematic chain that may differ from the configuration of the arm 600 (e.g., comprising multiple articulated joints) may interface to the actuator 610. Additional actuators may be utilized with the arm in order to control additional DOF.

Figure 7:
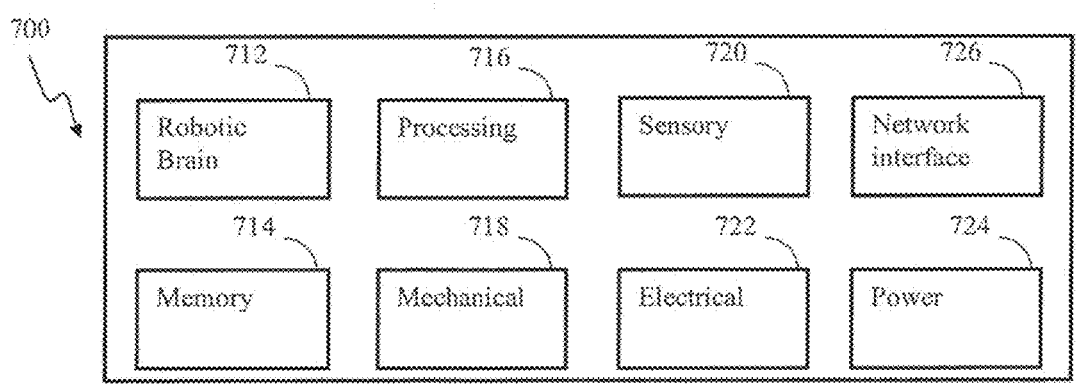
FIG. 7 is a functional block diagram illustrating components of an autonomy module for use with the trainable modular robotic apparatus e.g., of the system described infra at FIG. 9, in accordance with one implementation.

FIG. 7 is a functional block diagram detailing components of an autonomy module for use with the trainable modular robotic apparatus, in accordance with one implementation. The robotic apparatus 700 includes a robotic brain 712 for control of the device. The robotic brain may be implemented within a computer program embodied as instructions stored in non-transitory computer readable media, and configured for execution by a processor. In other embodiments, the robotic brain may be implemented as dedicated hardware, programmable logic (e.g., field programmable gate arrays (FPGAs), and/or other logic), application specific integrated circuits (ASIC), and/or other. Additional memory 714 and processing capacity 716 is available for other hardware/firmware/software needs of the robotic device. The processing module may interface to the sensory module in order to perform sensory processing e.g., object detection, face tracking, stereo vision, and/or other tasks.

In some implementations, the robotic brain 712 interfaces with the mechanical components 718, sensory components 720, electrical components 722, power components 724, and network interface 726 via one or more driver interfaces and software abstraction layers. In one or more implementations, the power components 724 may comprise one or more of a direct current, an alternating current source, Da mechanical coupling, energy accumulator (ethical capacitor) and/or mechanical (e.g., a flywheel, a wind-up module), wireless charger, radioisotope thermoelectric generator, thermocouple, piezo-generator, a dynamo generator, a fuel cell, an internal or external combustion engine, a pneumatic, a hydraulic, and/or other energy source. In some implementations, the power components 724 may be built into the AM. In one or more implementations, the power components 724 may comprise a module that may be removed and/or replaced without necessitating disconnecting of the actuator interfaces (e.g., 142, 144 in FIG. 1) from the body of the robot.

Additional processing and memory capacity may be used to support these processes. However, it will be appreciated that these components may be fully controlled by the robotic brain. The memory and processing capacity may also aid in management for the autonomy module (e.g. loading executable code (e.g., a computational brain image), replacing the code, executing operations during startup, and/or other operations). As used herein, a "computational brain image" may comprise executable code (e.g., binary image files), object code, bytecode, an array of weights for an artificial neuron network (ANN), and/or other computer formats.

Consistent with the present disclosure, the various components of the device may be remotely disposed from one another, and/or aggregated. For example, robotic brain software may be executed on a server apparatus, and control the mechanical components of an autonomy module via a network or a radio connection. Further, multiple mechanical, sensory, or electrical units may be controlled by a single robotic brain via network/radio connectivity.

The mechanical components 718 may include virtually any type of component capable of motion (e.g., to move the robotic apparatus 700, and/or other) or configured to perform a desired function or task. These may include, without limitation: motors, servos, pumps, hydraulics, pneumatics, stepper motors, rotational plates, micro-electro-mechanical devices (MEMS), electro-active polymers, and/or other motive components. The components interface with the robotic brain and enable physical interaction and manipulation of the device.

The sensory components 720 allow the robotic device to accept stimulus from external entities. These may include, without limitation: video, audio, haptic, capacitive, radio, accelerometer, ultrasonic, infrared, thermal, radar, lidar, sonar, and/or other sensing components.

The electrical components 722 include virtually any electrical component for interaction and manipulation of the outside world. These may include, without limitation: light/radiation generating components (e.g. light emitting diodes (LEDs), infrared (IR) sources, incandescent light sources, and/or other), audio components, monitors/displays, switches, heating elements, cooling elements, ultrasound transducers, lasers, and/or other. Such components enable a wide array of potential applications in industry, personal hobbyist, building management, medicine, military/intelligence, and other fields (as discussed below).

The network interface includes one or more connections configured to interact with external computerized devices to allow for, inter alia, management and/or control of the robotic device. The connections may include any of the wireless or wireline interfaces discussed above, and further may include customized or proprietary connections for specific applications.

The power system 724 is configured to support various use scenarios of the device. For example, for a mobile robot, a wireless power solution (e.g. battery, solar cell, inductive (contactless) power source, rectification, and/or other) may be appropriate. However, for fixed location applications which consume significant power (e.g., to move heavy loads, and/or other), a wall power supply may be a better fit. In addition, in some implementations, the power system and or power consumption may be configured with the training of the robotic apparatus 700. Thus, the robot may improve its efficiency (e.g., to consider power consumption efficiency) through learned management techniques specifically tailored to the tasks performed by the robotic apparatus.

Figure 8A:
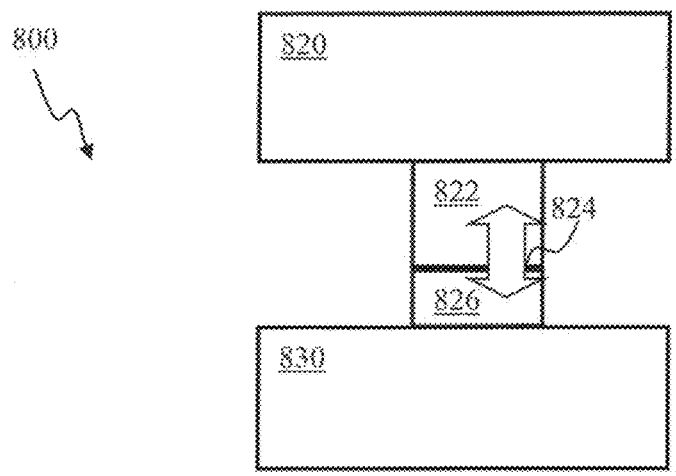
FIG. 8A is a functional block diagram illustrating a general configuration of coupling interface between an autonomy module and a robotic body, in accordance with one implementation.

FIG. 8A illustrates the mechanical coupling of an autonomy module to a robotic body using an electromechanical interface. In one exemplary embodiment, the interface includes a proprietary interface for use with the trainable modular robotic apparatus. In other embodiments, the interface is based on existing connector technologies and/or communication protocols (e.g., USB, Firewire, Ethernet CAT6, and/or other)

The apparatus 800 of FIG. 8A comprises the autonomy module (AM) 830 coupled to a robotic body 820. The coupling is effectuated via a coupling mechanism 826, 822. Common examples of coupling mechanisms include, without limitation, physical connector assemblies (based on e.g., snap, friction, male/female, and/or other), magnetic connector assemblies, and/or other.

The coupling 826, 822 may provide one or more electrical signals (e.g., current, voltage, and/or other), mechanical inputs (e.g., rotational momentum, linear velocity, angular velocity, pressure, force, torque, and/or other), electromagnetic signals (e.g., light, radiation, and/or other), mass transfer (e.g., pneumatic gas flow, hydraulic liquid flow, and/or other) from one module (e.g., 820) of the apparatus 800 to another module (830) or vice versa, as denoted by arrows 824. For example, the AM 830 may receive feedback from the body 820 via the interface 822, 826. Thereafter, the processing module of the AM (e.g., 716 in FIG. 7) utilizes the feedback 824 to determine movements and/or state of the robotic body by e.g., sensing actuator position, torque, current, and/or other.

In one exemplary embodiment, the AM 830 may be configured to provide a mechanical output 824 to robotic body 820. In one or more implementations, the mechanical output 824 may be characterized by one or more of a rotational momentum, a linear velocity, an angular velocity, a pressure, a linear force, a torque, and/or other parameter. The coupling mechanism between the AM and the body (e.g., 822, 826) may comprise a proprietary mechanical, electrical, and/or electromechanical interface optimized for transmission of relevant parameters. In some implementations, the interface portion 822 and/or 826 may be configured to be mechanically adjusted relative the complementary interface portion (e.g., via a slide-rotate motion, extend/contract, and/or other) in order to provide secure coupling.

By way of a non-limiting example, FIGS. 8B-8E illustrate interface configurations in accordance with some implementations.

Figure 8B:
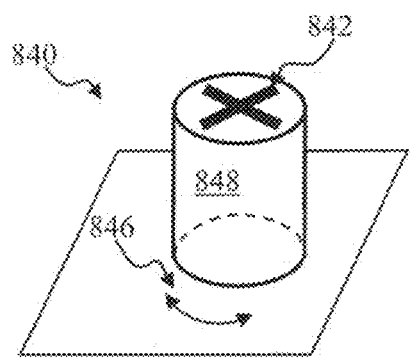
FIG. 8B is a functional block diagram illustrating a coupling interface configured to provide rotational motion from an autonomy module to a robotic body, in accordance with one implementation.

FIG. 8B illustrates a coupling interface configured to provide rotational motion from an autonomy module to a robotic body of, e.g., configuration illustrated in FIG. 8A, in accordance with one implementation. The interface 840 may comprise an element 848 configured to be rotated by an actuator of an AM module (e.g., 830 of FIG. 8A) around a longitudinal axis of the element 848 in a direction shown by arrow 846. The element 848 may comprise a coupling mechanism (e.g., a key 842) configured to couple the element 848 to an element of the robotic body (e.g., 820 in FIG. 8A). Coupling 842 may be adapted to match load, torque, and/or other characteristics of the motion being transferred from the actuator to the body.

Figure 8C:
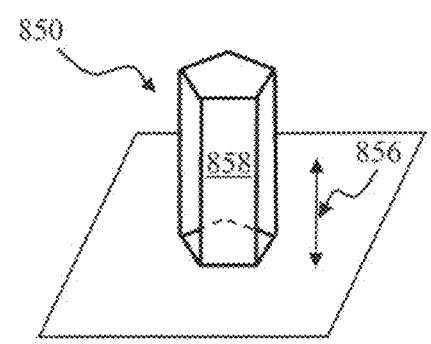
FIG. 8C is a functional block diagram illustrating a coupling interface configured to provide translational motion from an autonomy module to a robotic body, in accordance with one implementation.

FIG. 8C illustrates a coupling interface configured to provide translational motion from an autonomy module to a robotic body of, e.g., configuration illustrated in FIG. 8A, in accordance with one implementation. The interface 850 may comprise an element 858 configured to be displaced by an actuator of an AM module (e.g., 830 of FIG. 8A) along a longitudinal axis of the element 858 in a direction shown by arrow 856. The element 858 may comprise a coupling mechanism (e.g., a key, a slot, a friction, a spring coupling, and/or other) configured to couple the element 858 to an element of the robotic body (e.g., 820 in FIG. 8A).

Figure 8D:
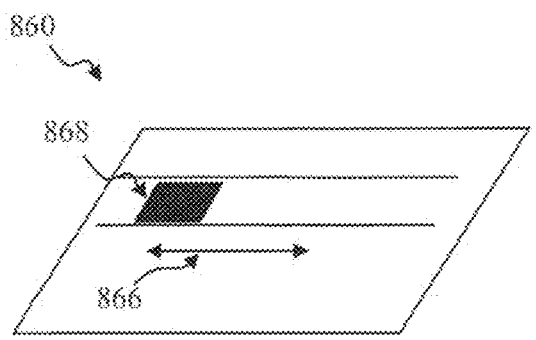
FIG. 8D is a functional block diagram illustrating a slider coupling interface configured to a pivoting motion from an autonomy module to a robotic body, in accordance with one implementation.

FIG. 8D illustrates a slider coupling interface configured to a pivoting motion from an autonomy module to a robotic body of, e.g., configuration illustrated in FIG. 8A, in accordance with one implementation. The interface 860 may comprise an element 868 configured to be displaced by an actuator of an AM module (e.g., 830 of FIG. 8A) along a direction shown by arrow 866. The element 868 may comprise a coupling mechanism (e.g., a keyed element, a friction, a spring coupling, and/or other) configured to couple the element 868 to an element of the robotic body (e.g., 820 in FIG. 8A).

Figure 8E:
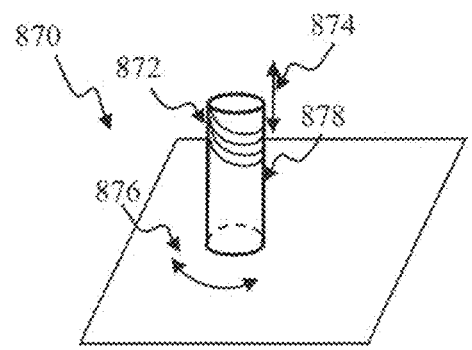
FIG. 8E is a functional block diagram illustrating a coupling interface configured to provide translational and/or rotational motion from an autonomy module to a robotic body, in accordance with one implementation.

FIG. 8E is a functional block diagram illustrating a coupling interface configured to provide translational and/or rotational motion from an autonomy module to a robotic body, of, e.g., configuration illustrated in FIG. 8A, in accordance with one implementation. The interface 870 may comprise an element 878 configured to be rotated by an actuator of an AM module (e.g., 830 of FIG. 8A) around a longitudinal axis of the element 878 in a direction shown by arrow 876. The element 878 may comprise a coupling mechanism 872, comprising a thread and/or one or more groves. The mechanism 872 may be utilized to convert the rotational motion 876 of the element 878 to translational motion 874 of, e.g., a tendon of the robotic body (e.g., 820 in FIG. 8A). The coupling mechanism 872 may comprise an adaptor that may be coupled to the element 878 in order to, e.g., match load, torque, and/or other characteristics of the motion being transferred from the actuator to the body.

It will be recognized by those skilled in the arts that coupling configurations shown and described above with respect to FIGS. 8B-8E serve to illustrate principles of the disclosure and various other coupling mechanisms may be utilized. It will also be recognized that specific configuration of coupling mechanism (e.g., 842 in FIG. 8B) may be adapted to match nature of motion being transferred (e.g., linear vs axial), load, torque, and/or other characteristics.

Figure 9:
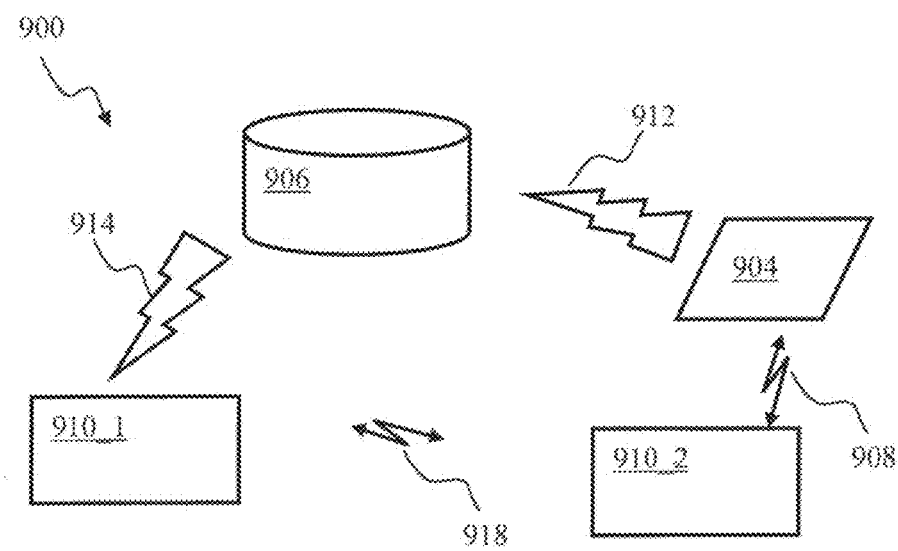
FIG. 9 is a functional block diagram illustrating a computerized system comprising the trainable modular robotic apparatuses of the present disclosure, in accordance with one implementation.

FIG. 9 is a functional block diagram illustrating a computerized system configured to operate a trainable modular robotic apparatus of the disclosure, in accordance with one implementation. The system 900 may comprise a computerized depository 906 configured to provide trained robotic brain images to controllers within one or more AM (e.g., 910_1, 910_2). The robotic brain images may comprise executable code (e.g., binary image files), bytecode, an array of weights for an artificial neuron network (ANN), and/or other computer formats. In some implementations, the depository 906 may comprise a cloud server depository 906. In FIG. 9, remote AM devices (e.g., 910_1) may connect to the depository 906 via a remote link 914 in order to save, load, update, their controller configuration (brain). In some implementations, remote AM devices (e.g., 910_2) may connect to the depository 906 via a local computerized interface device 904 via a local link 908 in order to facilitate learning configuration and software maintenance of the user device 910. In one or more implementations, the local link 908 may comprise a network (Ethernet), wireless link (e.g. Wi-Fi, Bluetooth, infrared, radio), serial bus link (USB, Firewire, and/or other), and/or other. The local computerized interface device 904 may communicate with the cloud server depository 906 via link 912. In one or more implementations, links 912 and/or 914 may comprise an internet connection, and/or other network connection effectuated via any of the applicable wired and/or wireless technologies (e.g., Ethernet, Wi-Fi, LTE, CDMA, GSM, and/other).

In some implementations, two (or more) trained AM may exchange brain images with one another, e.g., as shown by arrow 918 in FIG. 9. A user may train controller of the robot using, e.g., haptic learning method described herein. The user may elect to provide (share) trained controller configuration (brain image) to one or more other AM. The brain image provision transaction may comprise one or more of the following: free, for a fee, in kind exchange, trade, and/or other. The robotic brain images may comprise executable code (e.g., binary image files), bytecode, an array of weights for an artificial neuron network (ANN), and/or other computer formats.

By way of a non-limiting example, personnel of a hobby store may pre-train a given robot (e.g., the bear 300 of FIG. 3A) to possess a certain behavior (e.g., dance). The trained controller configuration may be loaded to other controllers by the store personnel. Bear toys sold by the store and comprising the pre-trained AM may provide clients with a pre-trained functionality not available to clients of other stores thereby providing the hobby store with a competitive advantage and potentially increasing sales of bear toys. In some implementations, the trained controller configuration may be provided to buyers on a computer readable medium, offered for download via an app store, and/or using other methods.

In one or more applications that may require computational power in excess of that that may be provided by a processing module of the AM 910_2 the local computerized interface device 904 may be used to perform computations associated with training and/or operation of the robotic body coupled to the AM 910_2. The local computerized interface device 904 may comprise a variety of computing devices including, for example, a desktop PC, a laptop, a notebook, a tablet, a phablet, a smartphone (e.g., an iPhone®), a printed circuit board and/or a system on a chip (SOC) comprising one or more of general processor unit (GPU), field programmable gate array (FPGA), multi-core central processing unit (CPU), an application specific integrated circuit (ASIC), and/or other computational hardware (e.g., a bitcoin mining card BitForce®).

Figure 10:
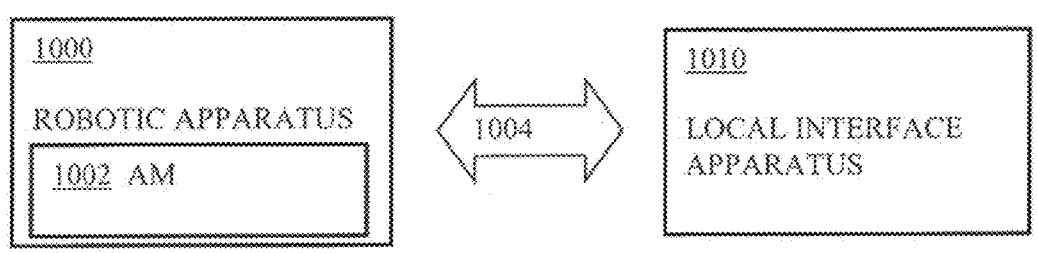
FIG. 10 is a functional block diagram illustrating the interfacing of a trainable modular robotic apparatus to an interface device for use with e.g., the system of FIG. 9, in accordance with one implementation.

FIG. 10 illustrates a trainable modular robotic apparatus interfacing to a local user computerized device, in accordance with one implementation. The robotic apparatus 1000 of FIG. 10 comprises a controller module that is embedded within the autonomy module 1002. As shown, the AM 1002 interfaces to a local network interface apparatus 1010. The local network interface apparatus 1010 provides network connectivity for the AM 1002 to a remote data depository (e.g., a cloud server via the Internet) via a local link 1004. In one or more implementations, the apparatus 1010 may comprise a computing device such as: a tablet, a phablet, a laptop, a smartphone, a computer, a network hub, a wireless access point, and/or other. The link 1004 may comprise a wireless Bluetooth link, a Wi-Fi link, and/or other connectivity. In some implementations, the link 1004 may comprise a wired connection (e.g., Ethernet, serial bus, and/or other)

In one exemplary embodiment, the configuration shown in FIG. 10 may be particularly useful in order to reduce complexity, size, and/or cost of an autonomy module that provides long range network connectivity (e.g., cellular modem, Ethernet port, and/or Wi-Fi). Using the existing local network interface 1010 (e.g., via a smartphone, and/or a wireless access point(AP)), the robotic device 1000 may be capable of connecting to a remote data depository (such as was previously described).

Robotic devices comprising an autonomy module of the present disclosure may be trained using online robot training methodologies described herein, so as to perform a target task in accordance with a target trajectory.

Training may be implemented using a variety of approaches including those described in U.S. patent application Ser. No. 14/040,520 entitled "APPARATUS AND METHODS FOR TRAINING OF ROBOTIC CONTROL ARBITRATION", filed Sep. 27, 2013, Ser. No. 14/088,258 entitled "APPARATUS AND METHODS FOR TRAINING OF NOVELTY DETECTION IN ROBOTIC CONTROLLERS", filed Nov. 22, 2013, Ser. No. 14/070,114 entitled "APPARATUS AND METHODS FOR ONLINE TRAINING OF ROBOTS", filed Nov. 1, 2013, Ser. No. 14/070,239 entitled "REDUCED DEGREE OF FREEDOM ROBOTIC CONTROLLER APPARATUS AND METHODS", filed Nov. 1, 2013, Ser. No. 14/070,269 entitled "APPARATUS AND METHODS FOR OPERATING ROBOTIC DEVICES USING SELECTIVE STATE SPACE TRAINING", filed Nov. 1, 2013, and Ser. No. 14/102,410 entitled "APPARATUS AND METHODS FOR HAPTIC TRAINING OF ROBOTS", filed Dec. 10, 2013, each of the foregoing being incorporated herein by reference in their entireties.

Figure 11:
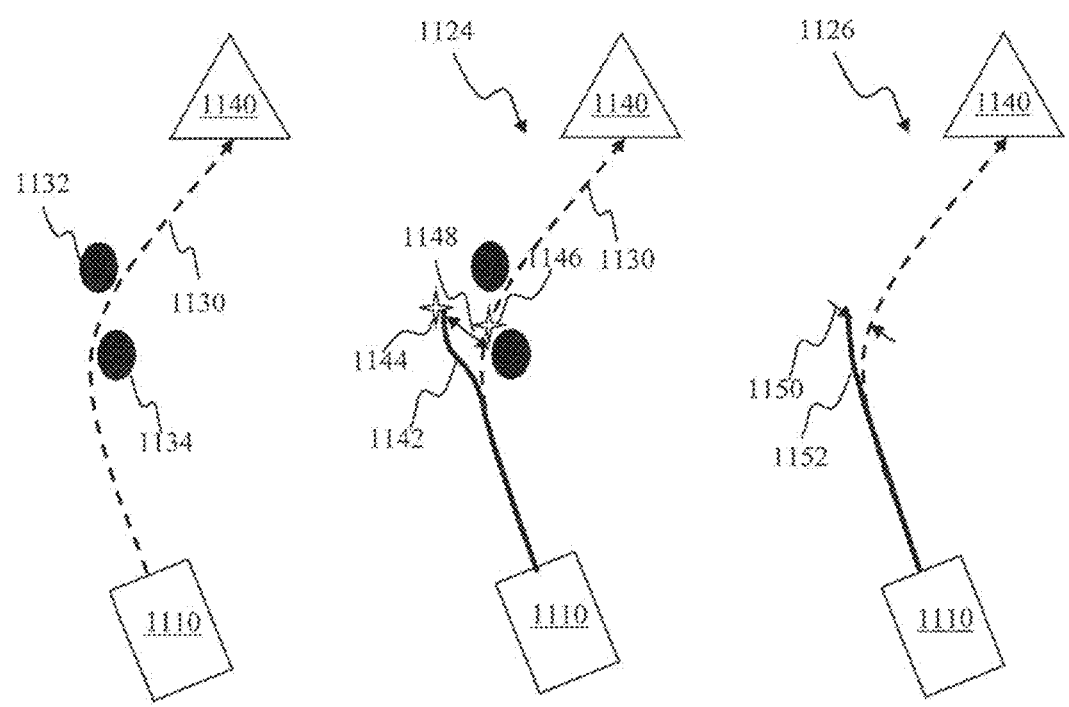
FIG. 11 is a graphical illustration depicting multiple trajectories for use in the haptic training of a robot, in accordance with one or more implementations.

FIG. 11 illustrates an exemplary trajectory configuration useful with online haptic training of a learning controller within an autonomy module (such as was previously described). A robotic device 1110 may include a rover body comprising an autonomy module coupled thereto and/or an end-effector, e.g., an arm). As shown, the rover 1110 is trained to approach the target 1140 and avoid obstacles 1132, 1134. The target approach/avoidance task of the device 1110 may be characterized by a target trajectory 1130. Training may be performed by a training entity over multiple trials (e.g., 1124, 1126 in FIG. 11). Robot operation during a given trial may be based on one or more control commands generated by a controller of the robot (e.g., under supervision of a human) in accordance with sensory context. In one or more implementations the context may comprise information about the position and/or movement of the robot 1110, obstacles 1132, 1134, and/or the target 1140. The controller of the robot may comprise a predictor module e.g., described in U.S. patent application Ser. No. 13/842,530, entitled "ADAPTIVE PREDICTOR APPARATUS AND METHODS", filed Mar. 15, 2013, incorporated supra.

The training entity may comprise a human user and/or a computerized agent. During a given trial, the training entity may observe an actual trajectory of the robot e.g., the trajectory 1142 during the trial 1124 in FIG. 11. As shown in FIG. 11, the actual trajectory (shown by the solid line 1142) of the robot at a location 1144 may diverge from the target trajectory (shown by the broken line 1130) by of an amount indicated by an arrow 1148. Based on detecting the discrepancy 1148 between the target trajectory 1130 and the actual trajectory 1142, the training entity may provide a teaching input to the robotic device 1110 at the location 1144. The training input may comprise a haptic action, characterized by a physical contact between the trainer and the robotic device controller. In some implementations, the haptic action may comprise one or more of a push, a pull, a movement (e.g., pick up and move, move forward, backwards, rotate, reach for an object, pick up, grasp, manipulate, release, and/or other movements), a bump, moving the robot or a portion thereof along a target trajectory, holding the robot in place, and/or other physical interactions of the trainer with the device 1110.

In another example (not shown), the human user can train a manipulator arm based on haptic input. The haptic input may comprise the trainer grabbing and moving the arm along a target trajectory. The arm may be equipped with a force/torque sensor. Based on the sensor readings (from the force/torque vectors generated by the trainer), the controller infers the appropriate control commands that are configured to repeat the motion of the arm.

Referring back to FIG. 11, as a result of the haptic input, the robot's actual trajectory is adjusted to location 1146. The controller of the robot 1110 is configured to detect the trajectory displacement 1148, and characterize the trajectory displacement 1148 as a change in the state of the robot. In one or more implementations, the robot state change may be based on a modification of one or more parameters. Examples of such parameters may include one or more of motion characteristics of the robotic platform (e.g., speed, acceleration, orientation, rotation, and/or other motion characteristics), joint position, motor current draw, motor torque, force on a motor/joint, and/or other. In one or more implementations, the unpredicted change in the state of the robotic device (e.g., due to trainer actions) is interpreted as teaching input. In some implementations a state change may occur due to an external condition (e.g., a collision with an obstacle, a skid due to a loss of traction, and/or other external condition). Those of ordinary skill in the related art will further appreciate that the training input may be indicated to the robotic controller using e.g., visual and/or audio signal (clues) accompanying the haptic input. For example, an audible command (e.g., a click) or the appearance of a portion of the trainer's body (e.g., a hand, and/or other) within a sensory video frame may indicate teaching input. In some implementations, the teaching input may be detected using one or more tactile sensors mounted on the robotic body. The user indicates that the robot should change its trajectory by interaction with a specific sensor (e.g., by pressing a button, and/or other) For example, pressing a button on the back of the robot is interpreted as a teaching command to move forward. In one or more implementations, mapping of the user commands to sensory input may be pre-defined (e.g., hard-coded) or learned using supervised learning or reinforcement learning.

Based on the training input associated with the state adjustment 1148, the controller of the robot infers the appropriate behavior of the robot. In some instances, the controller may further adjust its learning process to take into account the teaching input. For example, based on the adjusted learning process, robot action during a subsequent trial (e.g., 1126, may be characterized by the trajectory 1152 of the robot being closer to the target trajectory 1130 (e.g., the discrepancy 1150 for the trial 1126 being smaller than the discrepancy 1148 for the trial 1124).

Various approaches may be utilized in order to determine a discrepancy between the current trajectory and the target trajectory along the trajectory. In one or more implementations, the discrepancy may be represented as a measured distance, a normalized distance ("norm"), a maximum absolute deviation, a signed/unsigned difference, a correlation, a point-wise comparison, and/or a function of an n-dimensional distance (e.g., a mean squared error). In one or more implementations, the distance D between the actual x and the predicted state $x^P$ may be determined as follows:

$$D=D(x^P-x), \qquad (Eqn. 1)$$

$$D=D(\text{sign}(x^P)-\text{sign}(x)), \qquad (Eqn. 2)$$

$$D=D(\text{sign}(x^P-x)), \qquad (Eqn. 3)$$

where D denotes an n-dimensional norm operation.
]

Exemplary Methods

Figure 12:
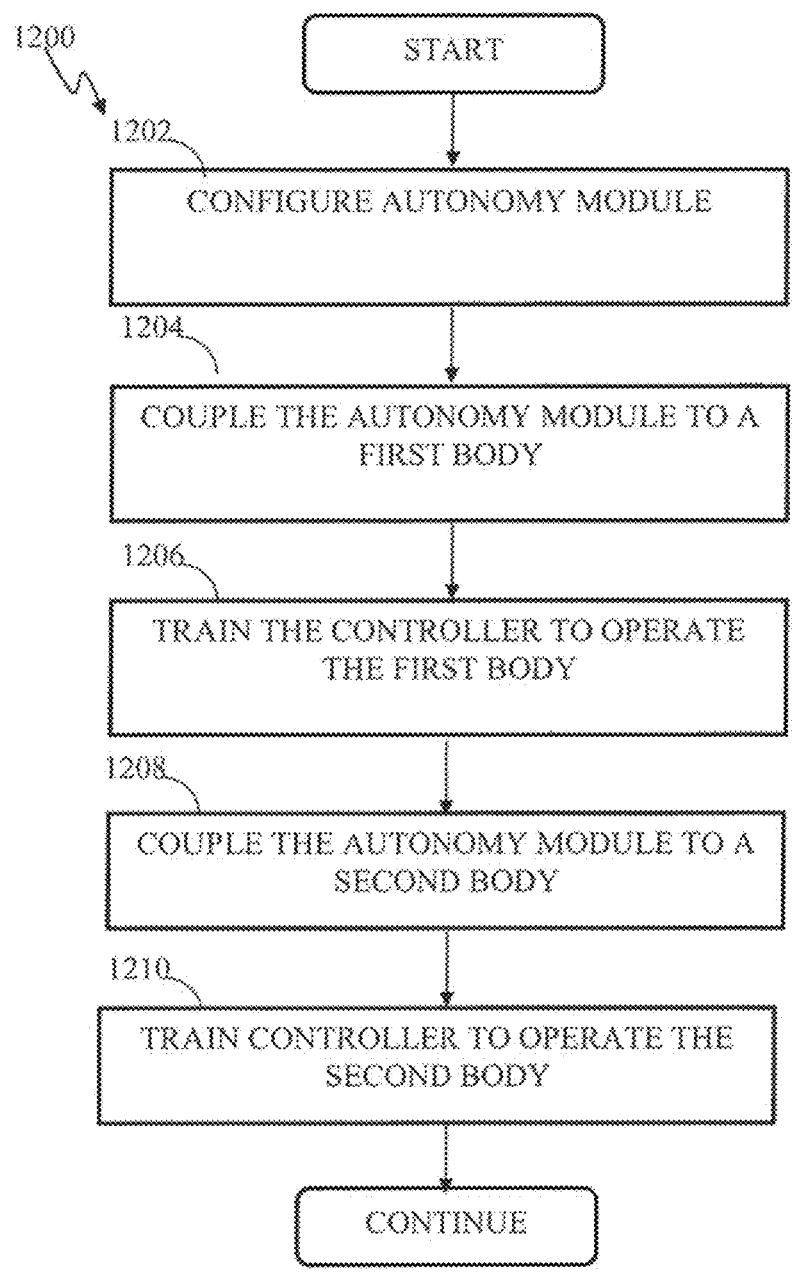
FIG. 12 is a logical flow diagram depicting a generalized method for expanding the functionality of a robotic device consistent with various implementations described herein.
Figure 13:
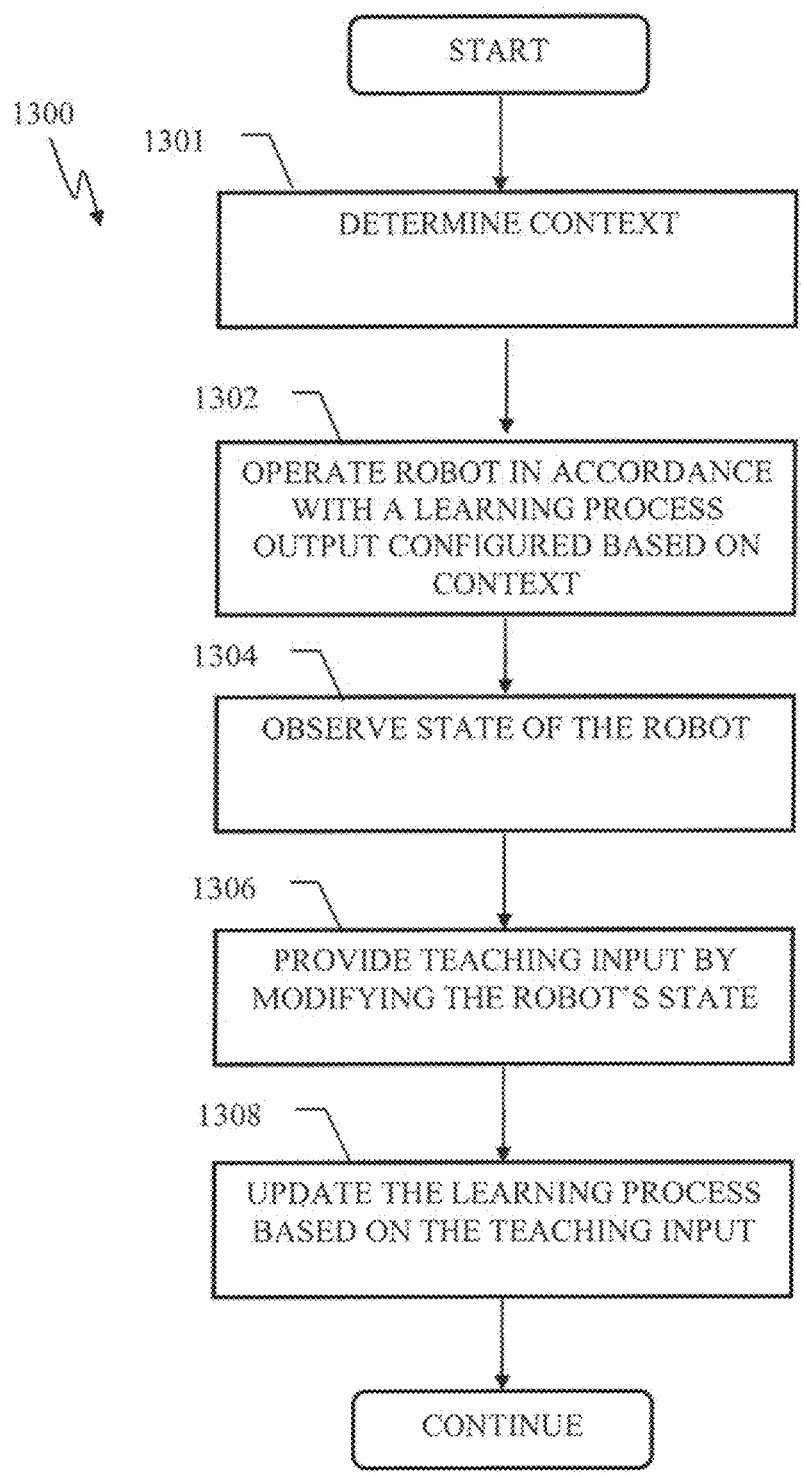
FIG. 13 is logical flow diagram illustrating a method of haptic training of a robotic device comprising an autonomy module, in accordance with one or more implementations.

FIGS. 12 and 13 illustrate methods 1200, 1300 of operating robotic devices comprising autonomy module of the disclosure. The operations of methods 1200, 1300 presented below are intended to be illustrative. In some implementations, methods 1200, 1300 may be accomplished with one or more additional operations not described, and/or without one or more of the operations discussed. Additionally, the order in which the operations of method 1200, 1300 are illustrated in FIGS. 12 and 13 and described below is not intended to be limiting.

In some implementations, methods 1200, 1300 may be implemented using one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of methods 1200, 1300 in response to instructions stored electronically on an electronic storage medium. The one or more processing devices may include one or more devices configured through hardware, firmware, and/or software to be specifically designed for execution of one or more of the operations of methods 1200, 1300.

FIG. 12 illustrates a generalized method for expanding functionality of a robotic device consistent with various implementations described herein.

At operation 1202 an autonomy module may be adapted to comprise two or more actuators, a controller, and/or a sensor. The controller may be configured to operate individual actuators so as to control two or more degrees of freedom distinct from one another. In some implementations, the two or more DOF may comprise motion with respect to two or more orthogonal axes, two or more motions of different kinematics (e.g., translation and rotation), and/or other.

At operation 1204 the AM may be coupled to a first robotic body. In some implementations, the first body may comprise, e.g., a robotic toy (e.g., a giraffe), a plane, a car and/or other. Coupling may be effectuated using a dedicated interface (e.g., a combination of proprietary locking male/female connectors). The first body may comprise two or more elements configured to be operated in first and second DOF that are distinct kinematically from one another.

At operation 1206 the controller of the AM may be trained to operate the first body. The operation may comprise manipulating the two or more elements of the first body in the first and the second DOF to accomplish a task (e.g., manipulating a two joint arm to touch a target).

At operation 1208 the AM may be coupled to a second robotic body. In some implementations, the second body may comprise, e.g., a robotic toy (e.g., a giraffe), a plane, a car and/or other. Coupling may be effectuated using a dedicated interface (e.g., a combination of a proprietary locking male/female connectors). The second body may be characterized by kinematic chain that is configured different from the kinematic chain of the first body as e.g., in a two single joint arms vs one two individually controller joints arm, a four-limbed animal (e.g., the bear 300) vs. a plane 340, and/or other configurations. The second body may comprise two or more elements configured to be operated in at least two of the first, the second, and a third DOF that are distinct kinematically from one another.

At operation 1210 the controller of the AM may be trained to operate the second body. The operation may comprise manipulating the two or more elements of the second body two DOF to accomplish a task (e.g., manipulating a two single-joint arms to touch a target).

FIG. 13 illustrates a method of haptic training of a robotic device, in accordance with one or more implementations described herein. In one or more implementations, the training may be effectuated by a trainer comprising a human operator and/or a computerized agent. Training performed according to method 1300 may be based on multiple iterations (as previously discussed). For example, during individual iterations of a multiple iteration process, the robot may be configured to navigate a trajectory.

At operation 1301 of method 1300, a context is determined. In some implementations, the context may comprise one or more aspects of sensory input and/or feedback that may be provided by the robot platform to the controller. In one or more implementations, the sensory aspects may include: detection of an object, a location of an object, an object characteristic (color/shape), a sequence of movements (e.g., a turn), a sensed characteristic of an environment (e.g., an apparent motion of a wall and/or other surroundings turning a turn and/or approach) responsive to a movement, and/or other. In some implementation, the sensory input may be collected while performing one or more training trials of the robotic apparatus.

At operation 1302 of method 1300, the robot is operated in accordance with an output determined by a learning process of the robot based on the context. For example, referring back to FIG. 11, the context may comprise the detected location of objects 1132, 1134; the resultant output may comprise a control command to one or more actuators of the rover 1110 configured to execute a right turn. Operation in accordance with the output results in a trajectory 1142 of the robot.

At operation 1304 of method 1300, the state of the robot is observed by the trainer. In one implementation, the state may represent the position of a rover along a trajectory (for example, in FIG. 11, location 1144 of the trajectory 1142), the orientation and/or velocity of a manipulator, etc. Based on the state observation at operation 1304, the trainer may determine that the actual robot state does not match the target state (referring back to FIG. 11, the trainer may determine that the actual trajectory location 1144 does not match the target trajectory location 1146).

At operation 1306 of method 1300, a teaching input is provided to the robot when the trainer modifies the robot's state via e.g., physical contact with the robot platform. In some implementations, the physical contact comprises a haptic action which may include one or more of a push, a pull, a movement (e.g., pick up and move, move forward, backwards, rotate, reach for an object, pick up, grasp, manipulate, release, and/or other movements), a bump, moving the robot or a portion thereof along a target trajectory, holding the robot in place, and/or other physical interaction of the trainer with the robot. In manipulator arm embodiments, training with haptic input may comprise the trainer grabbing and moving the arm along the target trajectory.

At operation 1308 of method 1300, the learning process of the robot is updated based on the training input (e.g., haptic input). In one or more implementations, the learning process may comprise a supervised learning process configured based on the teaching signal. In some embodiments, the teaching signal may be inferred from a comparison of the robot's actual state with a predicted state (for example, based on Eqn. 1-Eqn. 3, and/or other). During subsequent time instances, the robot may be operated in accordance with the output of the updated learning process (for example, as previously discussed with respect to FIG. 11).

Exemplary Uses and Applications

In some implementations, the autonomy module (AM) may house motor, sensory, power, and processing components needed to operate one or more robotic bodies. The robotic bodies may comprise one or more swappable limbs, and/or other body parts configured to interface to the AM. In one or more implementations, the AM may be adapted to interface to existing robotic bodies (e.g., for retro-fitting of existing robotic bodies with newer AMs). In such implementations, the AM may provide power, processing, and/or learning capabilities to existing non-learning robots.

A variety of connectivity options may be employed in order to couple an AM to a body of a robot including, for example, screws, bolts, rivets, solder, glue, epoxy, zip-ties, thread, wire, friction, pressure, suction, and/or other means for attachment. The modular architecture described herein may be utilized with a variety of robotic devices such as e.g., inanimate toys, robotic manipulators, appliances, and/or vehicles.

A variety of business methods may be utilized in order to trainable modular robotic devices. In some implementations, a supplier (e.g., Brain Corporation) may develop, build, and provide complete AM modules (e.g., 200, 240, 260) to one or more clients (e.g., original equipment manufacturers (OEM), e.g., toy manufacturing company), and/or resellers and/or distributors (e.g., Avnet, Arrow, Amazon). The client may install the AM within one or more trainable robotic toys. An agreement between the supplier and the client may comprise a provision for recurring maintenance and updates of the AM software (e.g., drivers for new sensors, actuators, updates to processing and/or learning code and/or other).

In one or more implementations, the supplier may provide a client (e.g., the OEM) with a bare bone AM kit (e.g., a chipset with processing, memory, software) while the client may (under a license) add sensors, actuators, power source, and/or enclosure.

In one or more implementations, the supplier may provide a ASIC, a software library, and/or a service to develop a custom hardware and/or software solution for the client (e.g., provide a demo mode for a robotic toy to enable customers to evaluate the toy in a retail environment).

Cloud Management—

Various implementations of the present disclosure may utilize cloud based network architecture for managing of controller code (e.g., computational brain images). As individual users (or groups of users) begin creating computational brain images through the training process, different tasks related to computational brain image management (e.g., storage, backup, sharing, purchasing, merging, and/or other operations) are performed. User experience with respect to these tasks is at least partly dependent on the ease with which they are performed, and the efficacy of the systems provided for their completion. Cloud-based architectures allow a user to protect and share their work easily, because computational brain images are automatically remotely stored and are easily retrieved from any networked location. The remote storage instantly creates a spatially diverse backup copy of a computational brain image. This decreases the chance of lost work. In various implementations, a computational brain image stored on a server is also available in any location in which a user has access to an internet connection. As used herein, the term cloud architecture is used to generally refer to any network server managed/involved system (generally provided by a $3^{rd}$ party service). This may refer to connecting to a single static server or to a collection of servers (potentially interchangeable) with dynamic storage locations for user content.

It will be appreciated that while the term "user" as discussed herein is primarily contemplated to be a human being, it is also contemplated that users may include artificially intelligent apparatus themselves. For instance, in one exemplary training paradigm of the disclosure, a human being trains a first learning controller of an AM apparatus (or group of apparatus), the latter of which are then used to train other "untrained" controllers, thereby in effect leveraging the training model so as to permit much more rapid and pervasive training of a large numbers of controller apparatus such as e.g., robots (i.e., the training process then goes "viral").

Referring back to FIG. 9, the computerized system may be used to effectuate a cloud-based training system according to the contents of the present disclosure. A user may utilize on-board or accessible network connectivity to connect the AM 910_1 to the depository 906 implemented within a cloud server. Upon authentication, the user identifies a computational brain image to be loaded onto the AM learning controller (e.g., the robotic brain module 712 in FIG. 7). In one or more implementations, the computational brain image may comprise a plurality of neural network weights so that the download image sets the neural network weights of the robotic brain module. Additionally, the user may access personal content and/or public content (e.g. shared/purchasable content) from the cloud server. In some implementations, the AM 910_2 may use a local connectivity device 904 as a bridge in order to connect to the depository 906.

For shared applications, a user may designate computational brain images to upload and download from the cloud server. To designate computational brain images for download, the user browses the computational brain image content of the cloud server via the interface device 904 or via a browser application on another mobile device or computer. The user then selects one or more computational brain images. The computational brain images may be transmitted for local storage on the AM of a robotic device, user interface device, portable storage medium (e.g., a flash memory), and/or other computerized storage.

The computational brain images displayed in the browser may be filtered to aid in browsing and/or selection of the appropriate computational brain image. Text or other searches may be used to locate computational brain images with certain attributes. These attributes may be identified for example via metadata (e.g. keywords, descriptions, titles, tags, user reviews/comments, trained behaviors, popularities, or other metadata) associated with the computational brain image file. Further, in some implementations, computational brain images may be filtered for compatibility with the hardware of the AM and/or robotic platform (e.g. processor configuration, memory, on board sensors, cameras, servos, microphones, or any other device on the robotic apparatus). In various ones of these implementations, the cloud server connects to the AM apparatus (or otherwise accesses information about the apparatus, such as from a network server, cloud database, or other user device) to collect hardware information and other data needed to determine compatibility. In some implementations, the interface device 904 collects and sends this information. In some implementations, the user inputs this information via the browser. Thus, the user (or administrator of the cloud server 906) may control which computational brain images are displayed during browsing. Hardware (and software) compatibility may be judged in a binary fashion (i.e. any hardware mismatch is deemed incompatible), or may be listed on a scale based on the severity of the mismatch. For example, a computational brain image with training only to identify red balls is not useful without a color sensing capability. However, a computational brain image that controls legs but not sound sensors may still be used for a device with legs and a sound sensor. The cloud process (or user interface device) may also be configured to assist the user in "fixing" the incompatibilities; e.g., links or other resources to identify a compatible computational brain image.

In some implementations, the cloud server may aid in the improvement of "brain" operation. In an exemplary implementation, the cloud server receives network operating performance information from a brain, and determines how to improve brain performance by adapting the brain's current network image. This may be achieved via e.g., an optimization done in the cloud, or the cloud server may retrieve the optimization algorithms for the local hardware, and provide it to the customer's own computer. In some implementations, the cloud server may optimize performance by providing a new image to the brain that has improved performance in similar situations. The cloud may act as a repository of computational brain images, and select which image(s) is/are appropriate for a particular robot in a particular situation. Such optimization may be provided as a paid service, and/or under one or more other paradigms such as an incentive, on-demand model, or even under a barter system (e.g., in trade for another brain or optimization). In some implementations, users pay a one-time fee to receive an optimized image. In various implementations, users may subscribe to an optimization service and receive periodic updates. In some implementations, a subscription user may be given an assurance that for any given task, the cloud server provides the most optimized image currently known/available.

In various implementations, the performance metrics may be supplied by routines running on the brain or related hardware. For example, a brain may be trained to perform a specific action, and to determine its speed/efficiency in performing the action. These data may be sent to the cloud server for evaluation. In some implementations, an isolated set of routines (running on the same or separate hardware) monitors brain function. Such separated routines may be able to determine performance even in the case in which the brain itself is malfunctioning (rather than just having limited performance). Further, the user of the brain may use search terms based on performance metrics to find candidate/suggested brains meeting certain criteria. For example, the user may wish to find a computational brain image capable of doing a specific task twice as fast/efficiently as a currently loaded image.

To this end, in the exemplary implementations, computational brain images may be uploaded/stored as full or partial images. Full images may be loaded on to an autonomy module (AM) and run as a self-sufficient control application. Partial images may lack the full functions necessary to run certain features of the robotic device. Thus, partial images may be used to augment or upgrade (downgrade) a pre-loaded computational brain image or a stored computational brain image. It will be appreciated that a full computational brain image for a first device may serve as a partial computational brain image for second device with all of the functionality of the first plus additional features. In some implementations, two or more partial computational brain images may be combined to form full computational brain images.

Brain merges using the methods discussed above may also be used for combining computational brain images with conflicting or overlapping traits. In various implementations, these merge techniques may also be used to form full computational brain images from partial computational brain images.

In some embodiments, user accounts are linked to registered AM apparatus and a registered user (or users). During registration, the user provides personally identifiable information, and for access to purchasable content, financial account information may be required. Various embodiments may additionally incorporate authentication and security features using a number of tools known to those of skill in the art, given the contents of the present disclosure. For example, secure socket layer (SSL) or transport layer security (TLS) connections may be used to protect personal data during transfer. Further, cryptographic hashes may be used to protect data stored on the cloud servers. Such hashing may further be used to protect purchasable or proprietary computational brain images (or other content) from theft.

For shared and purchasable content the network validates computational brain images to ensure that malicious, corrupted, or otherwise non-compliant images are not passed between users via the cloud system. In one implementation, an application running on the cloud server extracts the synaptic weight values from the computational brain image, and creates a new file. Thus, corrupted code in auxiliary portions of a computational brain image is lost. A variety of methodologies may be utilized in order to determine as to whether the computational brain image is compliant, including, e.g., hash value computation (e.g., a check sum), credentials verification, and/or other. In some implementations, various checksums are used to verify the integrity of the user uploaded images. Various implementations further require that the AM apparatus to have internet connectivity for uploading computational brain images. Thus, the cloud server may create computational brain images directly from AM apparatus for sharing purposes. In such cases, the cloud server may require that the AM apparatus meet certain requirements for connectivity (e.g. updated firmware, no third-party code or hardware, and/or other)

The exemplary cloud server may also provide computational assistance to a brain to expand its size of the neural network a given brain may simulate. For example, if a brain is tasked with an operation it has failed to complete with its current computing resources or current computational brain image, it may request assistance from the cloud server. In some implementations, the cloud server may suggest/initiate the assistance. In implementations in which the cloud server monitors the performance of the brain (or is otherwise privy to performance metrics), the cloud server may identify that the image necessary to perform a given task is beyond the hardware capabilities of a given brain. Once the deficiency is identified, the cloud server may provide a new image and the computational resources needed to run the image. In some implementations, the cloud computing expansion may be initiated by a request for improved performance rather than a deficiency that precludes operation. A cloud server operator provides the expanded computing functionality as a paid service (examples of paid services include: usage-based, subscriptions, one-time payments, or other payment models).

In various implementations, cloud computing power may be provided by ad hoc distributed computing environments such as those based on the Berkeley Open Infrastructure for Network Computing (BOINC) platform. Myriad distributed implementations for brains may be used, such as those described in U.S. Provisional Patent Application Ser. No. 61/671,434, filed on Jul. 13, 2012, entitled "INTELLIGENT MODULAR ROBOTIC APPARATUS AND METHODS", now U.S. patent application Ser. No. 13/829,919 filed on Mar. 14, 2013, entitled "INTELLIGENT MODULAR ROBOTIC APPARATUS AND METHODS" and/or U.S. patent application Ser. No. 13/830,398, entitled "NEURAL NETWORK LEARNING AND COLLABORATION APPARATUS AND METHODS", filed on Mar. 14, 2013, each of the foregoing previously incorporated herein in its entirety.

In some implementations, the trainable modular robotic device architecture described herein may afford development and use of robots via social interaction. For example, with reference to FIG. 9, the connectivity structure of the exemplary autonomy modules (e.g., 910), the interface device 904, and the cloud server 906 are designed to aid in fostering a social environment in which the AM controllers are trained. Through options in the training application, users may access content shared by other users. This content includes without limitation: media related to the training of the AM apparatus (e.g. videos, pictures, collected sensor data, wiki entries on training techniques/experiences, forum posts, and/or other media), computational brain images, third-party and so-called "homebrew" modifications (i.e., by small hobbyists), and/or other users may also form user groups to collaborate on projects or focus on specific topics, or even on the collective formation of a computational brain image (somewhat akin to extant distributed gaming interaction). In some implementations, users may also cross-link to groups and content on third-party social media websites (e.g. Facebook®, Twitter®, and/or other).

In some implementations, a storefront is provided as a user interface to the cloud. From the storefront, users may access purchasable content (e.g. computational brain images, upgrades, alternate firmware packages). Purchasable content allows users to conveniently obtain quality content to enhance their user experience; the quality may be controlled under any number of different mechanisms, such as peer review, user rating systems, functionality testing before the image is made accessible, etc. In some cases, users may prefer different starting points in training Some users prefer to begin with a clean slate, or to use only their own computational brain images as starting points. Other users may prefer not to have to redo training that has already been (properly or suitably) performed. Thus, these users appreciate having easy access to quality-controlled purchasable content.

The cloud may act as an intermediary that may link images with tasks, and users with images to facilitate exchange of computational brain images/training routines. For example, a robot of a user may have difficulty performing certain task. A developer may have an image well suited for the task, but he does not have access to individual robots/users. A cloud service may notify the user about the relevant images suited the task. In some implementations, the users may request assistance with the task. In various implementations, the cloud server may be configured to identify users training brains for specific tasks (via one or more monitoring functions), and alert users that help may be available. The notification may be based on one or more parameters. Examples of parameters may include the hardware/software configuration of the brain, functional modules installed on the robot, sensors available for use, kinetic configuration (how the robot moves), geographical location (e.g. proximity of user to developer), keywords, or other parameters. Further, in the case of training routines, the developer may wish to develop images suitable for a variety of robot configurations. Thus, the developer may be particularly interested in sharing a training routine in exchange for a copy of the user's computational brain image once the training routine is complete. The developer then has an expanded library of pre-trained image offerings to service future requests. In various implementations, one or more of the developer and/or trainer(s) for a given hardware configuration may receive compensation for their contributions.

In some approaches a subscription model may be used for access to content. In various implementations, a user gains access to content based on a periodic payment to the administrator of the networked service. A hybrid model may also be used. An initial/periodic subscription fee allows access to general material, but premium content requires a specific payment.

Other users that develop skill in training or those that develop popular computational brain images may wish to monetize their creations. The exemplary storefront implementation provides a platform to enable such enterprises. Operators of storefronts may desire to encourage such enterprise both for revenue generation and for enhanced user experience. For example, in one such model, the storefront operator may institute competitions with prizes for the most popular/optimized computational brain images, modifications, and/or media. Consequently, users are motivated to create higher quality content. The operator may also (or in lieu of a contest) instate a system of revenue and/or profit sharing for purchasable content. Thus, hobbyists and casual developers may see a reasonable return on their efforts. Such a system may also attract professional developers. Users as a whole may benefit from a wider array of content offerings from more skilled developers. Further, such revenue or profit sharing may be complemented or replaced with a system of internal credits for developers. Thus, contributors have expanded access to paid or otherwise limited distribution materials.

In various implementations, the cloud model may offer access to competing provider systems of computational brain images. A user may be able to reprogram/reconfigure the software elements of the system to connect to different management systems. Thus, competing image provision systems may spur innovation. For example, image provision systems may offer users more comprehensive packages ensuring access to computational brain images optimized for a wide variety of tasks to attract users to their particular provision network, and (potentially) expand their revenue base.

Various aspects of the present disclosure may advantageously be applied to, inter alia, the design and operation reconfigurable and/or modular robotic devices.

By way of an illustration, a user may purchase multiple robotic bodies (e.g., a giraffe, a lion, a dinosaur, and/or other) with a given AM. Upon training a giraffe to perform a particular task (e.g., dance) the user may swap the giraffe body for a lion. An app store may enable the user to search for code for already trained learning controller for the body of the lion that may be compatible with the AM of the user. The user may purchase, trade, and/or otherwise obtain the trained controller in order to utilize it with the new robotic body.

It is noteworthy that different robotic bodies (giraffe, lion) and/or different configurations of a given body (e.g., arm with a tendon attached at a variety of locations as shown in FIG. 6) may be characterized by different body kinematics (e.g., different range of motion of arm segment 608 depending on the tendon point of attachment. Differences in body kinematics, controllable degree of freedom, feedback from the body to the AM, sensory context changes (e.g., obtained by analyzing visual input via AM camera) may necessitate adaptation (training) of the AM controller.

In some implementations of the modular robotic device architecture described herein, two or more entities may provide individual components of a modular robot. A primary entity, for example, Brain Corporation, may provide the AM and/or the associated computational brain images. One or more other entities (e.g., third parties specializing in toy, plane, appliance manufacturing) may provide robotic bodies that may be compatible with a given AM. The one or more third parties may obtain a license from Brain Corporation in order to interface robotic bodies to the AM. In some implementation, the licensing agreement may include access to a proprietary AM-body interface.

Training of robotic devices outfitted with a learning autonomy mode may be facilitated using various interactions of user and robot. By way of an illustration, the user may utilize voice commands (e.g., approach, avoid), gestures, audible signals (whistle, clap), light pointers, RF transmitters (e.g., a clicker described in U.S. patent application Ser. No. 13/841,980, entitled "ROBOTIC TRAINING APPARATUS AND METHODS", filed on Mar. 15, 2013), and/or other. A robot trained to avoid red objects and approach green objects may initiate execution of respective task upon determining a given context (e.g., green ball in one or more images provided by robot's camera). The task execution may commence absent an explicit command by the user.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure presented herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles and architectures described herein. This description is in no way meant to be limiting, but rather should be taken as illustrative of the general principles of the disclosure. The scope of the disclosure should be determined with reference to the claims.

What is claimed:

1. An interface for use between components of a robotic apparatus, comprising:
    a first interface portion comprising a shape; and
    a second interface portion particularly adapted to interface only with other interface portions comprising the shape;
    wherein the robotic apparatus comprises a controller apparatus and a robotic body, the robotic body being selected from a plurality of robotic bodies compatible with the interface and the controller apparatus;
    wherein the first and second interface portions are configured to animate the robotic body via at least a mechanical force transferred over the first and second interface portions;
    wherein the first and second interface portions are further configured to transmit first one or more electrical signals from the robotic body to the controller apparatus, the first one or more electrical signals comprising first feedback from the robotic body, the first feedback being configured to train the controller apparatus to control the at least one of the first interface and the second interface portions so as to accomplish a first physical task via the animation of the robotic body; and
    wherein the first and second interface portions are further configured to transmit second one or more electrical signals from another one of the plurality of robotic bodies compatible with the interface and the controller apparatus, the second one or more electrical signals comprising second feedback from the other one of the plurality of robotic bodies, the second feedback being configured to train the controller apparatus to control the at least one of the first interface and the second interface portions to accomplish a second physical task via an animation of the other one of the plurality of robotic bodies.

2. The interface of claim 1, wherein the first interface portion comprises a substantially male feature, and the second interface portion comprises a substantially female feature, the substantially male and substantially female features being configured to rigidly but separably attach to one other.

3. The interface of claim 1, wherein:
    the first and second interface portions are configured to interface with each other;
    the interfaced first and second interface portions comprise at least one mechanical interface configured to transfer a force, and at least one electrical interface configured to transfer electrical signals or power across the interfaced first and second interface portions; and
    the shape comprises a substantially male feature.

4. The interface of claim 1, wherein the interface is configured to electrically connect the robotic body with the controller apparatus, the controller apparatus being configured to control the at least one of the first interface portion and the second interface portion, wherein the controller apparatus comprises:
    one or more sensory components configured to receive stimulus from one or more external entities; and
    a processing module in signal communication with the one or more sensory components;
    wherein the processing module is configured to perform one or more sensory processing functions.

5. The interface of claim 4, wherein the controller apparatus is in signal communication with the processing module; and wherein the controller apparatus is configured to utilize the received stimulus in order to infer a teaching signal.

6. The interface of claim 4, wherein the robotic body comprises a first one of the plurality of compatible robotic bodies apparatus each configured to be used with the interface.

7. The interface of claim 6, wherein the robotic body further comprises an identification apparatus, the identification apparatus configured to determine one or more characteristics of the first one of the plurality of compatible robotic bodies.

8. The interface of claim 7, wherein the one or more characteristics are selected from the group consisting of:
a body type for the robotic apparatus;
a kinematic configuration for the robotic body; and
a body model for the robotic body.

9. The interface of claim 7, wherein the one or more characteristics are communicated via one or more of the first interface portion and the second interface portion.

10. The interface of claim 7, further comprising a network interface in signal communication with one or more of the controller apparatus and the processing module;
wherein the network interface is further configured to receive one or more control processes in response to the determined one or more characteristics, the one or more control processes configured to effectuate control of the robotic body.

11. The interface of claim 4, wherein the first interface portion and the second interface portion collectively enable control of the robotic body in a plurality of controllable degrees of freedom.

12. The interface of claim 11, wherein at least one of the first interface portion and the second interface portion are configured to provide a rotational motion to at least a portion of the robotic body.

13. The interface of claim 11, wherein at least one of the first interface portion and the second interface portion are configured to provide a translational motion to at least a portion of the robotic body.

14. The interface of claim 11, wherein at least one of the first interface portion and the second interface portion are configured to provide a pivotal motion to at least a portion of the robotic body.

15. The interface of claim 4, wherein the received stimulus is further configured to control at least one of the at least first interface portion and the second interface portion.

16. The interface of claim 15, wherein the received stimulus comprises applied corrections to the robotic body by a user.

17. The interface of claim 16, further comprising a network interface in signal communication with one or more of the controller apparatus and the processing module;
wherein the network interface is further configured to transmit one or more control processes to an external device, the one or more control processes configured to effectuate control of another robotic body.

18. An interface for use between components of a robotic apparatus, comprising:
a first interface portion, the first interface portion configured to animate the robotic apparatus via at least a mechanical force transferred over the first interface portion; and
wherein the first interface portion is configured to communicate with a controller apparatus configured to operate the robotic apparatus, the controller apparatus comprising a plurality of computer-executable instructions, that when executed by a processor, are configured to implement a first adaptive learning process;
wherein:
the robotic apparatus comprises a first robotic body of a plurality of distinct robotic bodies that are compatible with the interface and the controller apparatus;
the first interface portion is further configured to transmit, during the implementation of the first adaptive learning process, training signals to perform a first operation of the robotic apparatus, the first operation comprising a first physical task via the animation of the first robotic body;
the controller apparatus is further configured to implement a second adaptive learning process; and
the first interface portion is further configured to transmit, during the implementation of the second adaptive learning process, training signals to perform a second operation of a second robotic body of the plurality of distinct robotic bodies that are compatible with the interface and the controller apparatus, the second operation comprising a second physical task via an animation of the second robotic body.

19. The interface of claim 18, wherein the adaptive learning process is characterized by a plurality of trials, and the adaptive learning process is configured to determine, during a trial of the plurality of trials, a first mechanical force transferred over the first interface portion.

20. The interface of claim 19, wherein during a subsequent trial of the plurality of trials, an adaptive mechanical force is transferred over the first interface portion, the adaptive mechanical force being closer to a target trajectory than the first mechanical force applied during the trial of the plurality of trials.

* * * * *